US008548143B2

(12) United States Patent
Vendrow

(10) Patent No.: US 8,548,143 B2
(45) Date of Patent: *Oct. 1, 2013

(54) INBOUND CALL IDENTIFICATION AND MANAGEMENT

(75) Inventor: Vlad Vendrow, Redwood City, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,474

(22) Filed: Jun. 18, 2012

(65) Prior Publication Data

US 2013/0016822 A1 Jan. 17, 2013

Related U.S. Application Data

(63) Continuation of application No. 13/251,192, filed on Sep. 30, 2011, now Pat. No. 8,213,587, which is a continuation of application No. 12/237,181, filed on Sep. 24, 2008.

(60) Provisional application No. 60/995,839, filed on Sep. 28, 2007.

(51) Int. Cl.
*H04M 3/42* (2006.01)
*H04M 11/04* (2006.01)

(52) U.S. Cl.
USPC ............ 379/201.01; 379/207.12; 379/211.01; 379/211.02; 379/212.01; 455/404.2; 455/417

(58) Field of Classification Search
USPC ............. 379/211.01, 201.01, 207.12, 211.02, 379/212.01; 455/417, 404.2
See application file for complete search history.

(56) References Cited

U.S. PATENT DOCUMENTS

| 5,195,131 A | 3/1993 | Sano |
| 5,530,740 A | 6/1996 | Irribarren et al. |
| 5,712,712 A | 1/1998 | Sayward |

(Continued)

FOREIGN PATENT DOCUMENTS

| EP | 0954193 | 11/1991 |
| JP | 64-054889 | 3/1989 |

(Continued)

OTHER PUBLICATIONS

"Automated Phone Trees: Two Potential Solutions," [online] Jul. 5, 2009; Retrieved from the Internet: <URL: http://developmentally.wordpress.com/2009/07/05/automated-phone-trees-two-potential-solutions/>; 3 pages.

(Continued)

*Primary Examiner* — Thjuan K Addy
(74) *Attorney, Agent, or Firm* — Fish & Richardson P.C.

(57) ABSTRACT

Methods, systems, and apparatus, including computer programs encoded on a computer storage medium, for inbound call identification and management. One of the systems includes one or more repositories that can include data representing call action policies and data representing attributes associated with the caller devices and the callee devices; and one or more computing devices that include a call identifier ("IDer") configured to characterize the attributes of the caller devices to form characterized attributes, a call management system controller configured to match the characterized attributes against routing criteria specified in the data representing the call action policies, and a call management system router configured to route calls from the caller devices to the callee devices responsive to a match between the characterized attributes and the routing criteria.

20 Claims, 13 Drawing Sheets

(56) References Cited

U.S. PATENT DOCUMENTS

| | | |
|---|---|---|
| 5,717,742 A | 2/1998 | Hyde-Thomson |
| 5,799,065 A | 8/1998 | Junqua et al. |
| 5,889,845 A | 3/1999 | Staples et al. |
| 5,896,448 A | 4/1999 | Holt |
| 5,987,535 A | 11/1999 | Knodt et al. |
| 6,038,451 A | 3/2000 | Syed et al. |
| 6,041,110 A | 3/2000 | Lautenschlager et al. |
| 6,104,790 A | 8/2000 | Narayanaswami |
| 6,230,024 B1 | 5/2001 | Wang et al. |
| 6,377,950 B1 | 4/2002 | Peters et al. |
| 6,442,404 B1 | 8/2002 | Sakajiri |
| 6,542,475 B1 | 4/2003 | Bala et al. |
| 6,584,093 B1 | 6/2003 | Salama et al. |
| 6,587,555 B1 | 7/2003 | Cripe et al. |
| 6,760,324 B1 | 7/2004 | Scott et al. |
| 6,792,085 B1 | 9/2004 | Rigaldies et al. |
| 6,801,341 B1 | 10/2004 | Joffe et al. |
| 6,801,520 B2 | 10/2004 | Philonenko |
| 6,816,483 B1 | 11/2004 | Beckstrom et al. |
| 6,870,910 B1 | 3/2005 | Armstrong et al. |
| 6,879,676 B1 * | 4/2005 | Contractor ............. 379/211.01 |
| 6,901,139 B2 | 5/2005 | Gonzalez et al. |
| 6,950,507 B1 | 9/2005 | Kaplan |
| 6,967,947 B1 | 11/2005 | Chen et al. |
| 6,987,840 B1 | 1/2006 | Bosik et al. |
| 6,993,360 B2 | 1/2006 | Plahte et al. |
| 6,993,561 B2 | 1/2006 | Lincke et al. |
| 6,999,469 B1 | 2/2006 | Chu et al. |
| 7,006,614 B2 | 2/2006 | Feinberg et al. |
| 7,024,457 B1 | 4/2006 | Newman et al. |
| 7,024,474 B2 | 4/2006 | Clubb et al. |
| 7,031,437 B1 | 4/2006 | Parsons et al. |
| 7,031,447 B2 | 4/2006 | Mani |
| 7,047,525 B2 | 5/2006 | Prunty et al. |
| 7,076,558 B1 | 7/2006 | Dunn |
| 7,110,523 B2 | 9/2006 | Gagle et al. |
| 7,123,608 B1 | 10/2006 | Scott et al. |
| 7,162,020 B1 | 1/2007 | Forte |
| 7,180,638 B1 | 2/2007 | Hou et al. |
| 7,184,527 B1 | 2/2007 | Lin et al. |
| 7,245,913 B1 | 7/2007 | Nguyen et al. |
| 7,254,643 B1 | 8/2007 | Peters et al. |
| 7,274,684 B2 | 9/2007 | Young et al. |
| 7,298,833 B2 | 11/2007 | Klein et al. |
| 7,308,255 B2 | 12/2007 | Loveland |
| 7,324,635 B2 | 1/2008 | Wood et al. |
| 7,333,820 B2 | 2/2008 | Sheha et al. |
| 7,359,368 B1 | 4/2008 | Pearce |
| 7,369,648 B1 | 5/2008 | Chang |
| 7,426,218 B1 | 9/2008 | Archer et al. |
| 7,640,293 B2 | 12/2009 | Wilson et al. |
| 7,702,669 B2 | 4/2010 | Vendrow et al. |
| 7,734,294 B2 | 6/2010 | Kent et al. |
| 7,822,186 B1 | 10/2010 | Boni |
| 7,941,130 B2 | 5/2011 | Moton, Jr. et al. |
| 7,996,036 B1 | 8/2011 | Chen et al. |
| 8,000,454 B1 | 8/2011 | Or-Bach et al. |
| 8,020,486 B2 | 9/2011 | Yamamoto et al. |
| 8,134,727 B1 | 3/2012 | Shmunis et al. |
| 8,213,587 B2 | 7/2012 | Vendrow |
| 8,305,622 B1 | 11/2012 | Shmunis et al. |
| 2002/0064149 A1 | 5/2002 | Elliott et al. |
| 2002/0067714 A1 | 6/2002 | Crain et al. |
| 2002/0080025 A1 | 6/2002 | Beattie |
| 2002/0085701 A1 | 7/2002 | Parsons et al. |
| 2002/0120697 A1 | 8/2002 | Generous et al. |
| 2002/0122547 A1 | 9/2002 | Hinchey et al. |
| 2003/0007625 A1 | 1/2003 | Pines et al. |
| 2003/0008612 A1 | 1/2003 | Andreason |
| 2003/0017860 A1 | 1/2003 | Choi |
| 2003/0095541 A1 | 5/2003 | Chang et al. |
| 2003/0186686 A1 | 10/2003 | Yang et al. |
| 2004/0005042 A1 | 1/2004 | Dhara et al. |
| 2004/0028208 A1 | 2/2004 | Carnazza et al. |
| 2004/0111305 A1 | 6/2004 | Gavan et al. |
| 2004/0120479 A1 | 6/2004 | Creamer et al. |
| 2004/0121814 A1 | 6/2004 | Creamer et al. |
| 2004/0160951 A1 | 8/2004 | Galvin et al. |
| 2004/0176083 A1 | 9/2004 | Shiao et al. |
| 2004/0198332 A1 | 10/2004 | Lundsgaard |
| 2004/0202300 A1 | 10/2004 | Cooper et al. |
| 2004/0203918 A1 | 10/2004 | Moriguchi et al. |
| 2004/0204038 A1 | 10/2004 | Suzuki et al. |
| 2004/0218748 A1 | 11/2004 | Fisher |
| 2004/0229620 A1 | 11/2004 | Zhao et al. |
| 2005/0047373 A1 | 3/2005 | Kojima |
| 2005/0047579 A1 | 3/2005 | Salame |
| 2005/0070310 A1 | 3/2005 | Caspi et al. |
| 2005/0083915 A1 | 4/2005 | Mathew et al. |
| 2005/0088686 A1 | 4/2005 | Tanimoto |
| 2005/0117733 A1 | 6/2005 | Widger et al. |
| 2005/0141479 A1 | 6/2005 | Ozugur et al. |
| 2005/0153739 A1 | 7/2005 | Halsell |
| 2005/0180551 A1 | 8/2005 | Meek et al. |
| 2005/0195802 A1 | 9/2005 | Klein et al. |
| 2005/0207556 A1 | 9/2005 | Gonzalez et al. |
| 2006/0008066 A1 | 1/2006 | Starling et al. |
| 2006/0018454 A1 | 1/2006 | Nonaka et al. |
| 2006/0023657 A1 | 2/2006 | Woodson et al. |
| 2006/0030357 A1 | 2/2006 | McConnell et al. |
| 2006/0043164 A1 | 3/2006 | Dowling et al. |
| 2006/0077957 A1 | 4/2006 | Reddy et al. |
| 2006/0085516 A1 | 4/2006 | Farr et al. |
| 2006/0099931 A1 | 5/2006 | Trujilo |
| 2006/0116127 A1 | 6/2006 | Wilhoite et al. |
| 2006/0126806 A1 | 6/2006 | Trandal et al. |
| 2006/0135202 A1 | 6/2006 | Ho et al. |
| 2006/0148490 A1 | 7/2006 | Bates et al. |
| 2006/0160566 A1 | 7/2006 | Plahte et al. |
| 2006/0161435 A1 | 7/2006 | Atef et al. |
| 2006/0205393 A1 | 9/2006 | Veen |
| 2006/0205436 A1 | 9/2006 | Liu et al. |
| 2006/0210050 A1 | 9/2006 | Bartfield et al. |
| 2006/0215543 A1 | 9/2006 | Croak et al. |
| 2006/0253895 A1 | 11/2006 | Brandofino et al. |
| 2007/0021098 A1 | 1/2007 | Rhodes et al. |
| 2007/0047534 A1 | 3/2007 | Hakusui |
| 2007/0058637 A1 | 3/2007 | Lo |
| 2007/0060137 A1 | 3/2007 | Yeatts et al. |
| 2007/0070976 A1 | 3/2007 | Mussman et al. |
| 2007/0105531 A1 | 5/2007 | Schroeder, Jr. |
| 2007/0111716 A1 | 5/2007 | Leigh et al. |
| 2007/0115498 A1 | 5/2007 | Noel et al. |
| 2007/0115978 A1 | 5/2007 | Kondo |
| 2007/0173237 A1 | 7/2007 | Roundtree |
| 2007/0198677 A1 | 8/2007 | Ozhan et al. |
| 2007/0253545 A1 | 11/2007 | Chatterjee et al. |
| 2007/0266077 A1 | 11/2007 | Wengrovitz |
| 2007/0298771 A1 | 12/2007 | Mottes |
| 2008/0002820 A1 | 1/2008 | Shtiegman et al. |
| 2008/0032704 A1 | 2/2008 | O'Neil et al. |
| 2008/0032716 A1 | 2/2008 | Forte |
| 2008/0037763 A1 | 2/2008 | Shaffer |
| 2008/0043976 A1 | 2/2008 | Maximo et al. |
| 2008/0056234 A1 | 3/2008 | Sprague |
| 2008/0075261 A1 | 3/2008 | Ramanathan et al. |
| 2008/0118052 A1 | 5/2008 | Houmaidi et al. |
| 2008/0144804 A1 | 6/2008 | Mergen |
| 2008/0186929 A1 | 8/2008 | Rice et al. |
| 2008/0240376 A1 | 10/2008 | Conway et al. |
| 2008/0279362 A1 | 11/2008 | Yasrebi et al. |
| 2008/0298567 A1 | 12/2008 | Guile |
| 2008/0318561 A1 | 12/2008 | Olshansky et al. |
| 2009/0015876 A1 | 1/2009 | Brown |
| 2009/0029724 A1 | 1/2009 | Hardy et al. |
| 2009/0054032 A1 | 2/2009 | Ren et al. |
| 2009/0059818 A1 | 3/2009 | Pickett |
| 2009/0080029 A1 | 3/2009 | Vendrow et al. |
| 2009/0086278 A1 | 4/2009 | Vendrow et al. |
| 2009/0086947 A1 | 4/2009 | Vendrow |
| 2009/0086950 A1 | 4/2009 | Vendrow et al. |
| 2009/0086953 A1 | 4/2009 | Vendrow |
| 2009/0097632 A1 | 4/2009 | Carnazza et al. |
| 2009/0116466 A1 | 5/2009 | Lee et al. |

| | | | |
|---|---|---|---|
| 2009/0131080 | A1 | 5/2009 | Nadler et al. |
| 2009/0154666 | A1 | 6/2009 | Rios et al. |
| 2009/0154678 | A1 | 6/2009 | Kewin et al. |
| 2009/0202050 | A1 | 8/2009 | Berger et al. |
| 2009/0296907 | A1 | 12/2009 | Vendrow et al. |
| 2009/0310598 | A1 | 12/2009 | Winbladh et al. |
| 2010/0002626 | A1 | 1/2010 | Schmidt et al. |
| 2010/0015995 | A1 | 1/2010 | Caspi et al. |
| 2010/0029272 | A1 | 2/2010 | McCann et al. |
| 2010/0035594 | A1 | 2/2010 | Vendrow et al. |
| 2010/0039676 | A1 | 2/2010 | Noel et al. |
| 2010/0039677 | A1 | 2/2010 | Noel et al. |
| 2010/0039678 | A1 | 2/2010 | Noel et al. |
| 2010/0039679 | A1 | 2/2010 | Noel et al. |
| 2010/0046037 | A1 | 2/2010 | Noel et al. |
| 2010/0046731 | A1 | 2/2010 | Gisby et al. |
| 2010/0080214 | A1 | 4/2010 | Li et al. |
| 2010/0081380 | A1 | 4/2010 | Lim et al. |
| 2010/0099390 | A1 | 4/2010 | Vendrow et al. |
| 2010/0099418 | A1 | 4/2010 | Holl et al. |
| 2010/0113013 | A1 | 5/2010 | Karabinis et al. |
| 2010/0128291 | A1 | 5/2010 | Vendrow et al. |
| 2010/0128861 | A1 | 5/2010 | Vendrow et al. |
| 2010/0128862 | A1 | 5/2010 | Vendrow |
| 2010/0128867 | A1 | 5/2010 | Vendrow et al. |
| 2010/0130172 | A1 | 5/2010 | Vendrow et al. |
| 2010/0130213 | A1 | 5/2010 | Vendrow et al. |
| 2010/0130228 | A1 | 5/2010 | Vendrow et al. |
| 2010/0183134 | A1 | 7/2010 | Vendrow et al. |
| 2010/0184408 | A1 | 7/2010 | Vendrow et al. |
| 2010/0185584 | A1 | 7/2010 | Vendrow et al. |
| 2011/0053643 | A1 | 3/2011 | Vendrow et et al. |
| 2011/0110511 | A1 | 5/2011 | Vendrow et al. |
| 2011/0130168 | A1 | 6/2011 | Vendrow et al. |
| 2011/0153668 | A1 | 6/2011 | Walker et al. |
| 2011/0177797 | A1 | 7/2011 | Vendrow et al. |
| 2011/0191441 | A1 | 8/2011 | Herriman et al. |
| 2011/0293083 | A1 | 12/2011 | Larson et al. |
| 2012/0021730 | A1 | 1/2012 | Vendrow |
| 2012/0021750 | A1 | 1/2012 | Vendrow et al. |

FOREIGN PATENT DOCUMENTS

| | | |
|---|---|---|
| JP | 2002-314642 | 10/2002 |
| JP | 2007-006288 | 1/2007 |
| KR | 1020000023675 | 4/2000 |
| KR | 1020010011139 | 2/2001 |
| KR | 1020020086695 | 11/2002 |
| KR | 1020040039569 | 5/2004 |
| KR | 1020050014088 | 2/2005 |
| KR | 1020050000884 | 6/2005 |
| KR | 1020050061255 | 6/2005 |
| KR | 1020050116096 | 12/2005 |
| KR | 1020060096568 | 9/2006 |
| KR | 1020060115833 | 11/2006 |
| KR | 1020070006314 | 1/2007 |
| KR | 10-0815239 | 3/2008 |
| KR | 1020080029682 | 4/2008 |
| KR | 1020090058808 | 6/2009 |
| KR | 1020100065221 | 6/2010 |
| WO | WO 95/11578 | 4/1995 |
| WO | WO 98/23080 | 5/1998 |
| WO | WO 98/27754 | 6/1998 |
| WO | WO 98/34391 | 8/1998 |
| WO | WO 98/47298 | 10/1998 |
| WO | WO 2006/022421 | 3/2006 |
| WO | WO 2006/056983 | 6/2006 |
| WO | WO 2007/025950 | 3/2007 |
| WO | WO 2007/053420 | 5/2007 |
| WO | WO 2008/074122 | 6/2008 |
| WO | WO 2010/059756 | 5/2010 |
| WO | WO 2010/062981 | 6/2010 |

OTHER PUBLICATIONS

"California Inventors Develop Caller Identification Based Call Routing Feature", US Fed News Services, Including US State News, Jan. 29, 2008, pp. 1-2.

"Call Routing Rules," IBM Lotus Sametime Unified Telephony Administrator's Guide, IBM Corp., 2009, p. 177; see also, Call Routing Rules <http://publib.boulder.ibm.com/infocenter/sametime/v8ro/index.jsp?topic=/com.ibm.help.sametime.telphony.doc/sut_adm_monitor_rules_c.html>.

"Remote access RADIUS attributes: Remote Access," Microsoft Technet, Microsoft Corporation, http://technet.microsoft.com/en-us/library/cc728366(WS.10).aspx (last updated Jan. 21, 2005).

Asterisk, I.T., "Asterfax-Asterisk Fax," Aug. 25, 2007, XP002598206. Retrieved from the Internet: <URL: http://web.archive.org/web/2007082533700/http://asterfax.sourceforge.net/index.html [retrieved on Aug. 24, 2010].

Cho, G., et al., "An Efficient Location and Routing Scheme for Mobile Computing Environments", IEEE Journal on Selected Areas in Communications, Jun. 1995, pp. 1-11, vol. 13, Issue 5.

Kaluza, Marcin, "Fax Services: Send Any Printable File from Your Program in Windows 2000" MSDN Magazine, Aug. 31, 2001, XP002598207. Retrieved from the Internet: <URL:http://msdn/microsoft/com/en-us/magazine/cc301661.aspx [retrieved on Jul. 7, 2012], 9 pgs.

Konstantoulakis, G., et al., Call Management Policy Specification for the Asterisk Telephone Private Branch Exchange, IEEE Workshop on Policies for Distributed Systems and Networks (Policy 2007), Jun. 13, 2007, pp. 1-11, Bologna, Italy.

L 'Ecuyer, M., et al., "Using Skills-based Routing to Enhance Contact Center Revenue and Performance. (Call Center/CRM Management Scope)," The Free Library (May 1, 2003) http://www.thefreelibrary.com/Using+skills-based+routing+to+enhance+contact+center+revenue+and . . . . . -a0102137613.

Lam, D., et al., "Modeling Location Management in Personal Communication Services", Oct. 18, 1995, pp. 1-27, IEEE International Conference on Universal Personal Communications, 1996.

Lam, D., et al., "Teletraffic Modeling for Personal Communications Services", IEEE Communications Magazine, Feb. 1997, pp. 1-9, Stanford University.

Maniatis, P., et al., "The Mobile People Architecture", ACM SIGMOBILE, Mobile Computing and Communications Review, vol. 3, Issue 3 (Jul. 1999), pp. 36-42, see also, <http://portal/acm.org/citation.cfm?id=329153>.

Mintz-Habib, M., et al., "A VoIP Emergency Services Architecture and Prototype", Computer Communications and Networks, 2005. ICCCN 2005, "Fourteenth International Conference on Computer Communications and Networks", Issue date Oct. 17-19, 2005, pp. 1-6, Columbia University.

Sripanidkulchai, et al., "Call Routing Management in Enterprise VoIP Networks", INM '07, Aug. 27-31, 2007, ACM SIGCOMM Workshop, pp. 1-6, Kyoto, Japan.

Stokes, S., et al., "A Priority System to Improve Callback Success in Telephone Surveys", Proceedings of the Survey Research Methods Section American Statistical Association, 1990, pp. 742-747, University of Texas at Austin, Austin, Texas.

Wang, H. et al., "ICEBERG: An Internet-core Network Architecture for Integrated Communications", pp. 1-13, IEEE, Personal Communications, vol. 7, Issue 4 (Aug. 2000).

AU Office Action dated Aug. 1, 2012 from Australian Patent Application No. 2008309022, 5 pages.

CN Office Action dated Apr. 23, 2012 from Chinese Patent Application No. 200880109068.6 (with English Translation), 18 pages.

CN Office Action dated Feb. 18, 2013, from Chinese Patent Office No. 200880109068.6 (with English Translation), 8 pages.

USPTO Final Office Action in U.S. Appl. No. 12/237,181, mailed Jun. 4, 2012, 22 pages.

USPTO Non-Final Office Action in U.S. Appl. No. 12/626,075, mailed Jul. 6, 2012, 16 pages.

USPTO Non-Final Office Action in U.S. Appl. No. 12/237,181, mailed Oct. 26, 2011, 22 pages.

USPTO Office Action in U.S. Appl. No. 12/429,116, mailed Apr. 12, 2012, 11 pages.

USPTO Office Action in U.S. Appl. No. 12/429,116, mailed Sep. 11, 2012, 7 pages.

USPTO Office Action in U.S. Appl. No. 13/245,837, mailed Apr. 4, 2012, 19 pages.

Authorized Offcier A. Nickitas-Etienne. International Preliminary Report on Patentability in International Application No. PCT/US2009/065036, Date of Mailing Jun. 3, 2011, 7 pages.
Authorized Officer S. H. Hwang. International Search Report and the Written Opinion in International Application No. PCT/US2009/065036; Date of Mailing Jul. 9, 2010, 10 pages.
Authorized Officer Copenheaver, B., International Search Report and Written Opinion of in International Application No. PCT/US2008/077546; mailed Dec. 8, 2008; 8 pages.
Authorized Officer Copenheaver, B., International Search Report and Written Opinion in International Application No. PCT/US2008/077683, mailed Dec. 10, 2008, 9 pages.
Authorized Officer Copenheaver, Blaine R., International Search Report and the Written Opinion in International Application No. PCT/US2009/045703, mailed Jul. 29, 2009, 5 pages.
European Search Report in European Application No. 08833690.4-1522/2193655, dated Sep. 9, 2010.
European Search Report in European Patent Application No. 08835856.9-2414/2193654, dated Jan. 30, 2012.
International Initial Publication with ISR in International Application No. PCT/US2008/077683, dated Apr. 9, 2009.
International Preliminary Report on Patentability as issued in Patent Application PCT/US2009/065969 on Jun. 9, 2011, 6 pages.
International Preliminary Report on Patentability as issued in Patent Application PCT/US2009/065036 on Jun. 3, 2011, 7 pages.
International Preliminary Report on Patentability from International Application No. PCT/US2008/077683, dated Mar. 30, 2010, 8 pages.
International Preliminary Report on Patentability from International Application No. PCT/US2009/051598, dated Feb. 8, 2011.
International Preliminary Report on Patentability from International Application No. PCT/US2009/051751, dated Apr. 26, 2011, 6 pages.
International Preliminary Report on Patentability from International Application No. PCT/US2009/065055, dated May 24, 2011, 5 pages.
International Preliminary Report on Patentability from International Application No. PCT/US2009/065985, dated May 31, 2011, 4 pages.
International Preliminary Report on Patentability from International Application No. PCT/US2009/065976, dated May 31, 2011, 5 pages.
International Preliminary Report on Patentability from International Application No. PCT/US2009/065987, dated May 31, 2011.
International Preliminary Report on Patentability from International Application No. PCT/US2010/044196, dated Mar. 6, 2012, 5 pages.
International Preliminary Report on Patentability in International Application No. PCT/US2009/065038, dated May 24, 2011.
International Preliminary Report on Patentability International Application No. PCT/US2009/051768, dated May 24, 2011.
International Search Report and Written Opinion as issued in Patent Application PCT/US2009/065036 on Jul. 9, 2010, 10 pages.
International Search Report and Written Opinion from International Application No. PCT/US2009/051751, dated Mar. 5, 2010, 3 pages.
International Search Report and Written Opinion in Application No. PCT/US2009/065969, dated May 28, 2010.
International Search Report from International Application No. PCT/US2009/051598, dated Apr. 1, 2010.
International Search Report from International Application No. PCT/US2009/051768, dated Jun. 10, 2010.
International Search Report from International Application No. PCT/US2009/065055, dated Jul. 7, 2010.
International Search Report from International Application No. PCT/US2009/065985, dated Jun. 22, 2010.
International Search Report from International Application No. PCT/US2009/065038, dated Jul. 2, 2010.
International Search Report from International Application No. PCT/US2009/065976, dated Jul. 2, 2010.
International Search Report from International Application No. PCT/US2009/065987, dated Jul. 14, 2010.
International Search Report from International Application No. PCT/US2010/044196, dated May 3, 2011.
International Search Report from International Application No. PCT/US2010/052880, dated Jun. 30, 2011.
International Search Report from International Application No. PCT/US2010/022075, dated Jul. 28, 2011.
International Written Opinion from International Application No. PCT/US2009/051598, dated Feb. 7, 2011.
International Written Opinion from International Application No. PCT/US2009/051768, dated May 25, 2011.
International Written Opinion from International Application No. PCT/US2009/065055, dated May 24, 2011.
International Written Opinion from International Application No. PCT/US2009/065985, dated Jun. 18, 2010, 3 pgs.
International Written Opinion from International Application No. PCT/US2009/065038, dated May 24, 2011.
International Written Opinion from International Application No. PCT/US2009/065987, dated May 25, 2011.
International Written Opinion from International Application No. PCT/US2010/044196, dated Mar. 1, 2012.
International Search Report and Written Opinion from Internal Application No. PCT/US2010/058569, dated Aug. 18, 2011, 8 pages.

* cited by examiner

INBOUND CALL IDENTIFICATION AND MANAGEMENT

CROSS-REFERENCE TO RELATED APPLICATIONS

This application is a continuation of U.S. Nonprovisional patent application Ser. No. 13/251,192, filed Sep. 30, 2011, which is a continuation of U.S. Nonprovisional patent application Ser. No. 12/237,181, filed Sep. 24, 2008, which claims the benefit of U.S. Provisional Patent Application No. 60/995,839, filed Sep. 28, 2007, all of which is herein incorporated by reference in entirety for all purposes.

FIELD OF THE INVENTION

Embodiments of the invention relate generally to computing devices and systems, as well as software, computer programs, applications, and user interfaces, and more particularly, to systems, devices and methods to identify inbound calls for dynamic routing of calls in a communication network for packetized and/or synchronous communications, and to manage the inbound calls.

BACKGROUND OF THE INVENTION

Traditional phone handling techniques to process an incoming call are limited in capability. Presently, calls can be routed to an alternate callee device, such as a phone, when the intended callee is unavailable. To provide for call rounding, a callee typically configures a calling path by specifying an identifier for the alternate callee device, such as a phone number, that is to be used instead of a primary telephone number associated with primary called device. When a caller dials the primary telephone number, the caller will be routed to the alternate callee device.

While traditional techniques for routing calls and electronic messages are functional, there are certain drawbacks to these techniques. Common call routing techniques rely on limited information regarding a caller and minimal logic to determine how to route calls. Thus, the rules for routing of calls can be relatively rigid, thereby limiting the ability of a caller to be routed effectively to a callee. Further, conventional call routing schemes are limited in conveying priorities of various incoming calls.

It would be desirable to provide computing devices and systems, as well as software, computer programs, applications, and user interfaces that minimize one or more of the drawbacks associated with conventional techniques for managing calls, including incoming calls, in communication network for packetized and/or synchronous communications.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
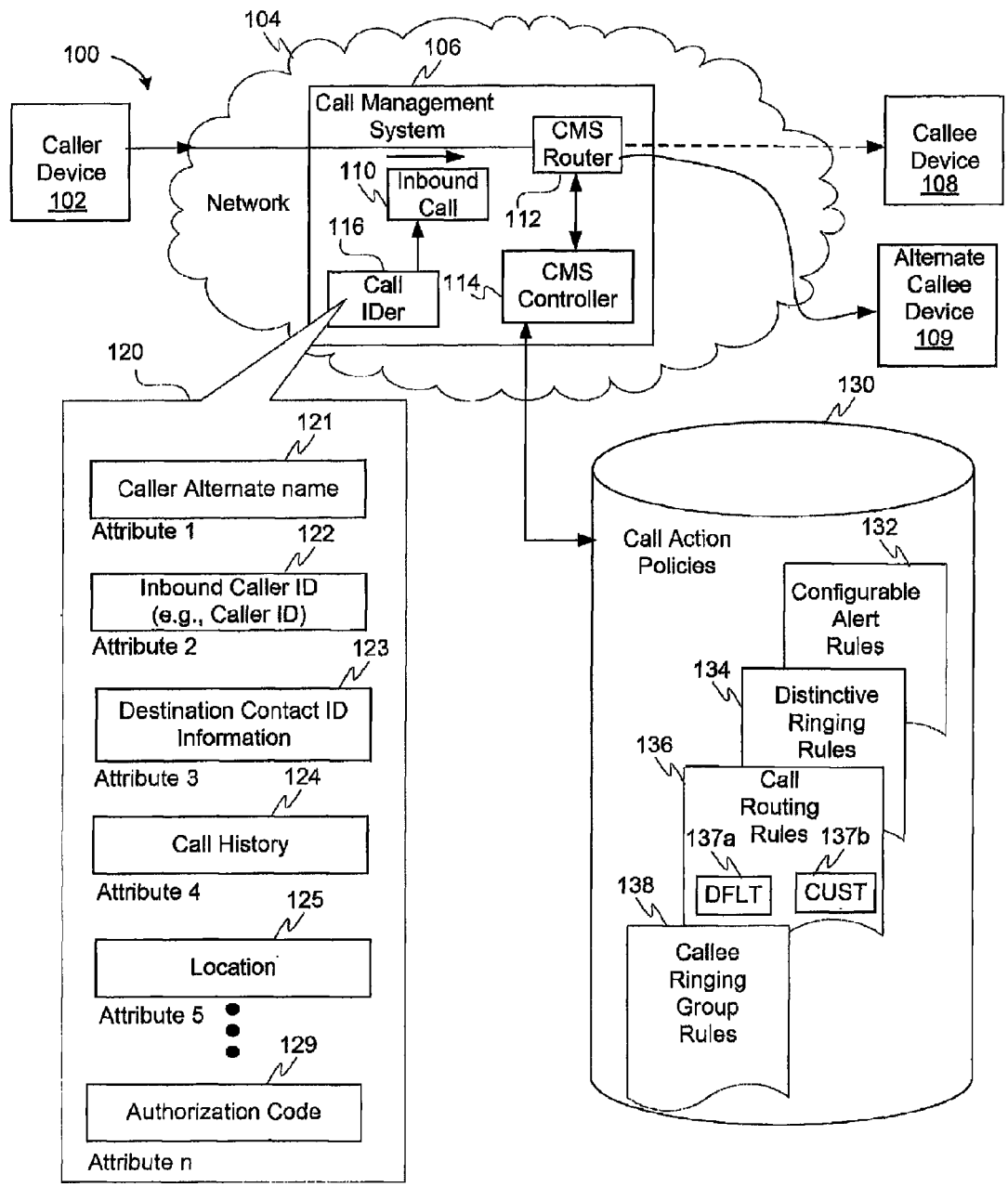
FIG. 1 is a diagram of a call management system, according to at least one embodiment of the invention.

FIG. 1 is a diagram 100 of a call management system, according to at least one embodiment of the invention. As shown, a call management system 106 is configured to analyze inbound calls, such as inbound call 110, that originates at a caller device 102 and traverses via network 104 to a callee device 108. Call management system 106 can be configured to manage outbound calls, too, in some cases. Call management system 106 includes a call management system router ("CMS router") 112, a call identifier ("Call IDer") 116, and a call management system ("CMS") controller 114, Call identifier 116 can be configured to determine a number of call attributes 120 from analyzing inbound call 110 to identify, among other things, the caller. In various embodiments, call attributes 120 can be determined from inbound call 110 or from a database that links information to data with inbound call 110—such as data representing a caller ID. Caller device 102 and callee device 108 can be any type of communication endpoint, such as an analog (PSTN) telephone, an IP (VoIP) phone, an email address, a pager, a symmetric messaging service destination address, or some other alert mechanism, such as a pager device.

As used at least in some embodiments, the term "call attribute" can refer to a characteristic of a caller, a caller device (e.g., phone, computer, etc) or any user or device that interacts with call management system 106, where the characteristic can be used by call management system 106 to route a call, determine the priority of a call, convey the priority of the call, or take any other action to facilitate call identification and management. Examples of call attributes include attribute ("1") 121, which can describe an alternate caller name to replace an initial name associated with a caller ID number. As such, call management system 106 can apply an alternate caller name for display in connection with inbound calls. This functionality can be configured by, for example, a system administrator or a user (e.g., at callee device 108). To illustrate, consider that a user may want to replace the inbound caller name with "preferred customer" or with the label "wife" or with the text "do not answer." Other examples of attributes include attribute ("2") 122, which can specify a caller ID number (or any other like identifier, such as an email address, messaging address, and the like) associated with caller device 102. Attribute ("3") 123 can specify contact information that can be associated, for example, with a specific caller ID number. For example, the specified contact information can include contact information or a pointer to contact information in an application (for extracting that contact information from the application). An example of such contact information includes the contacts in the Outlook® email program manufactured by Microsoft®, Call attributes 120 can also include attribute ("4") 124 to describe call history and related call information, Attribute ("5") 125 can specify spatial information, such as a location of, for example, a caller device, a callee device, a user device and the like. Call management system 106 can use the spatial information to determine appropriate call routing paths. For example, call management system 106 can be configured to route a call from a caller device to the nearest geographically-located callee device, Attribute ("n") 129 can describe an authorization code, or PIN, that can be used in association with inbound call 110 to authorize answering of a call, or any other attribute that can be used to characterize a call for routing the call.

Call management system controller 114 is coupled to repository 130 and call management system router 112, which can be configured to route inbound call 110 to an alternate callee device 109 as a function of call action policies set forth in repository 130. As shown, repository 130 can be configured to store call action policies, with the repository being disposed either in call management system 106 (not shown) or external thereto. In this example, repository 130 maintains a set of rules ("Configurable Alert Rules") 132 for initiating customizable alerts and/or notifications based on inbound call 110 and call attributes 120. Examples of such notifications include electronic messages that can include audio or text and are transmitted to, for example, a callee when a condition is met. An electronic message then can alert a user that a caller is trying to communicate (or has communicated) with the callee. A notification message can be an SMS message to a mobile phone, an email, or the like, with or with an attachment of the original message. Examples of configurable alert rules 132 include rules for selectably generating unique notification rules for different forms of communications, such as notification rules for voice messages, fax messages, incoming calls, and outbound fax receipt confirmations, and the like. Repository 130 can maintain a set of rules ("distinctive ringing rules") 134 that are configured to vary a ring cadence at callee device 108 as a function of priority. In some cases, the ring cadence defines a ringing period as a sum of ringing duration and non-ringing duration. In North America, for example, the default ring cadence is two seconds ringing and four seconds silence. When a caller-ID is matched to a caller associated with inbound call 110, then call management system 106 can change the ring cadence to signal for normal, escalated, or other priority ringing, according to default, priority, time-of-day and other user-defined rules. In at least some embodiments, the ring cadence can also refer to the general sound (or any other perceptible indicator) that a phone generates, whereby the sound can be representative of the priority of the call as well as the type of call under which the call can be categorized (e.g., the ring cadence can be varied as function of whether callers are seeking technical support, sales, or general information). A type of call can specify a priority set according to one of the following: a default setting, a time of day, at least one user-defined rule, and the like.

Repository 130 also can maintain a set of rules ("call routing rules") 136 for routing inbound call 110 based on, for example, data related to inbound call 110 as well as call attributes 120. In at least some embodiments, call routing rules 136 include sets of default rules ("DFLT") 137a and sets of customized rules ("CUST") 137b. As used herein, the term "default rule" can refer, at least in some embodiments, to a rule that specifies relatively static actions that a call management system is to take to route a call, for example, in sequence or in parallel, or in a combination thereof, or to take a predetermined action in respect to the call. One example of a default rule (i.e., default routing rule) includes a rule to forward a call to a sequence of a callee devices should a preceding callee device not connect with the call. Another example of a default routing rule includes a rule to forward a call to a number of callee devices in parallel. In at least some embodiments, a default routing rule can use an attribute, such as attribute 122, to route a call regardless of whether the attribute changes (e.g., regardless of whether a value for the attribute changes). An example of a default rule (i.e., a default action rule) is to apply a predetermined call ringtone, ring cadence, or sound associated with a call. As another example, call management system 106 can map a caller ID (e.g., attribute 122) to a destination contact ID (e.g., associated with attribute 123). In at least some embodiments, the caller ID as specified by attribute 121 can be associated with one or more destination contact IDs as specified by attributes 123. Thus, if call management system 106 is configured to route calls based on the caller ID, then call management system 106 can use, for example, a default routing rule 137a to route calls to callee devices 108 and 109 that are associated with the one or more contact IDs. For example, call identifier 116 can operate to identify a caller ID associated with inbound call 110 and indicate that the caller ID matches data representing attribute 122. Call management system 106 then can determine whether data representing attribute 122 is associated with data representing any of attributes 123. If so, call management system controller 114 can then apply call routing rules 136 to implement a default routing behavior. In particular, CMS router 112 can be configured to route inbound call 110 to the caller devices associated with one or more destination contact IDs associated with attribute 123. As destination contact IDs can include home phone numbers, mobile phone numbers, email addresses, and the like, inbound call 110 can be routed to an alternate caller device 109, which can be associated with a home phone number, a mobile phone number, an email address, and the like. In at least some embodiments, call management system 106 can extract the one or more destination contact IDs from an email application or any other application that includes contact information. Note that while call management system 106 can implement a default routing rule 137a to statically route inbound call 110 to a destination callee device specified by destination contact IDs, call management system 106 can implement a customized routing rule 137b to dynamically bypass default routing rule 137a to route to different destination contact IDs, according to some embodiments.

As used herein, the term "customized rule" can refer, at least in some embodiments, to a rule that specifies one or more actions that a call management system is to take dynamically to bypass a default rule and/or its static routing path. In at least some embodiments, a customized rule (i.e., a customized routing rule) can use one or more attributes 120 to determine whether to bypass a default routing rule. Thus, a customized routing rule can cause call management system 106 to a route a call (or take some dynamically determined action) as a function of whether one or more attributes (or values thereof) meet a routing criterion defining a triggering condition. A triggering condition can be an event in which one or more attributes meet the routing criteria. Also, a customized routing rule can cause call management system 106 to a route a call a function of whether any of the attributes changes (e.g., whether a value for an attribute changes). In at least some embodiments, a customized routing rule can be configured to bypass a default routing rule during the pendency of a triggering condition, after which the default routing rule can be used or reinstated. In some cases, the term "customized rule" can be used interchangeably with the term "dynamic rule." An example of a customized rule (i.e., a customized action rule) is a rule that dynamically applies a call ringtone, ring cadence, or sound associated with a call responsive to a determination based on attributes and criteria for triggering dynamic action implementation. A set of customized routing rules 137b in call routing rules 136 can be configured to route inbound call 110 differently as a function of the endpoints at callee device(s) 108 and/or caller device(s) 102. Further, these rules can set forwarding routes that can depend upon, for example, time-of-day, endpoint availability (e.g., whether a softphone application is on-line), presence status, endpoint contact and call history with the inbound call. Examples of presence status can be detected include Session Initiation Protocol ("SIP") presence messaging in which information about a callee's presence can be accessed by, for example, call management system 106 via known protocols (e.g., known integrated telephony and instant messaging contact lists).

In one embodiment, the set of customized routing rules 137b of call routing rules 136 can cause inbound call 110, which can be associated with an inbound caller-ID, to bypass some or all endpoints and ring specific other endpoints. For example, a user may want calls from an executive to be directly routed to the user's cell phone, thereby bypassing the called party's default routing rules that might otherwise route inbound call 110 to an assistant. Further, the set of call routing rules 136 can be configured to escalate inbound call 110. For example, a sequence of escalating call actions can be defined by, for example, the caller-ID, ANI, caller history, the time of day, the call frequency, or from any combination of conditions and/or call attributes 120. For example, if a caller calls twice within fifteen minutes, the call identification system can escalate a subsequent call by connecting the caller to a support agent at, for example, alternate callee device 109, rather than the intended recipient at callee device 108. Similarly, if a caller calls after working hours and the caller is recognized, then the call can be routed to an on-call or available support person at, for example, alternate callee device 109.

Repository 130 also can maintain a set of rules ("callee ringing group rules") 138 for routing inbound call 110 based on, for example, data related to inbound call 110, as well as on call attributes 120 to a group of endpoints, each of which can be similar to callee device 108. Call management system 106 can be configured to notify one or more parties, known as ringing groups, about incoming and about answered calls. Ringing groups can be defined, for example, by a system administrator or by one or more users, and can be dynamically reconfigured (e.g., using customized routing rules 137b or rules similar thereto) depending upon time-of-day, endpoint availability, presence status, endpoint call history, and other information relating to inbound call 110. In one embodiment, call management system 106 can route a call (e.g., associated with a customer having a relatively high priority) to the nearest callee device 108 in proximity to caller device 102, or to endpoints within a geographic region. To illustrate, consider that the data received by call management system 106 represents longitudinal and latitudinal positions. Call management system 106 then can determine whether the data representing the longitudinal and latitudinal positions matches any of attributes 125. If so, CMS router 112 can modify routing of inbound call 110 based on call routing rules 136 that specify how to dynamically route calls as a function of location. Further, data received by call management system 106 can specify the geographic location of callers and callees and can route calls based on the geographic regions, as well as the callers' and the callees' relative locations to those regions. As another example, inbound call 110 can be routed to endpoints, such as alternate callee device 109, at which a person can speak a requested language or demonstrate some special skill. In one embodiment, a destination contact ID 123 can be associated with a group of endpoints, whereby customizing the forwarding routes for one destination contact ID causes changes to the routes of inbound calls 110 associated with the caller-ID assigned to the one destination contact ID. Therefore, call management system 106 can specify routing calls to a specific destination phone number associated with a destination contact ID, and data representing the destination phone number can be modified (e.g., to substitute a new number) without modifying the call routing rules 136.

In one embodiment, call management system 106 can use caller identification information to determine whether to require an answering party to enter an authorization code or personal identification number (PIN). For example, if a school administrator calls a parent's number, when a party answers the call, call management system 106 can play a prompt to enter a PIN and compare the collected PIN against a set of allowed endpoint PINs, such as those stored as attributes 129. This limits answering privileges to parents with PINs so that they can answer a call from the school. In some cases, a system administrator or a user can assign answering authorization codes to inbound calls. A party or a machine that answers an inbound call can be prompted to enter their authorization code (PIN), too. In operation, call management system 106 can be configured to validate an entered PIN against stored pre-approved PINs, and, can repeat the prompt when PIN validation fails. Call management system 106 can be configured to play error messages, hang-up, and/or lock out return calls with endpoints that provide invalid PINs. The PIN authorization system can be applied to original, forwarded, transferred, and conference calls. Minimally, requesting a PIN from an answering device can eliminate connecting calls to fax, voice mail, pagers and other devices. Optimally, requiring a pre-authorized matching PIN confirms the answering party is allowed to talk with the calling party; for example, students can be connected only to pre-approved contact people.

Note that network 104 can include packet networks and switched networks, as well as any other suitable communications network. For example, private and/or public internet and switching networks can be used, such as IP networks (including protocols TCP, UDP, HTTP, etc.) and switched networks (including public switched telephone networks ("PSTN") or the like, as well as cellular (e.g., digital cellular), short message service ("SMS") and other wireless networks.)

Figure 2:
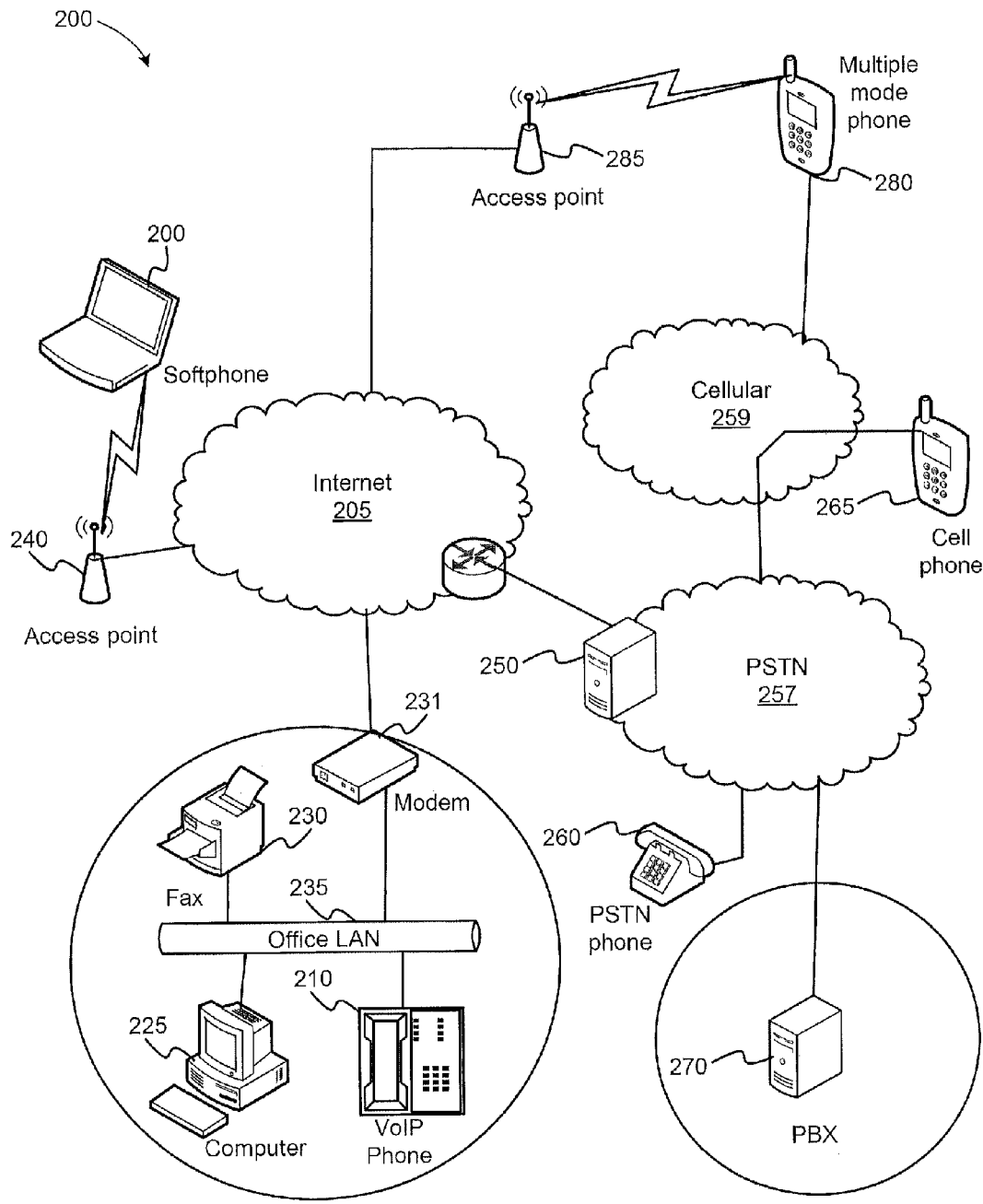
FIG. 2 is a diagram of a variety of endpoints that can interact with a call management system, according to at least one embodiment of the invention.

FIG. 2 is a diagram 201 of a variety of endpoints that can interact with a call management system, according to at least one embodiment of the invention. A call management system can perform inbound call identification when any of the following initiates a call: PSTN endpoints 260, enterprise PBX endpoints 270, Fax endpoints 230, cellular endpoints 265, dual mode endpoint 280 and VoIP endpoints 210 and 220, and the like. Any of these endpoints can be configured to operate as caller device 102, callee device 108, or alternate callee device 109, as shown in FIG. 1. In at least some embodiments, dual mode endpoint 280 can be a mobile computing device, such as a mobile communications device (e.g., a hand-held cellular phone), configured to access a cellular network 259 and a wireless network, such as a network configured to implement IEEE 802.11 technology (e.g., 802.11g, 802.11b, or the like).

Figure 3:
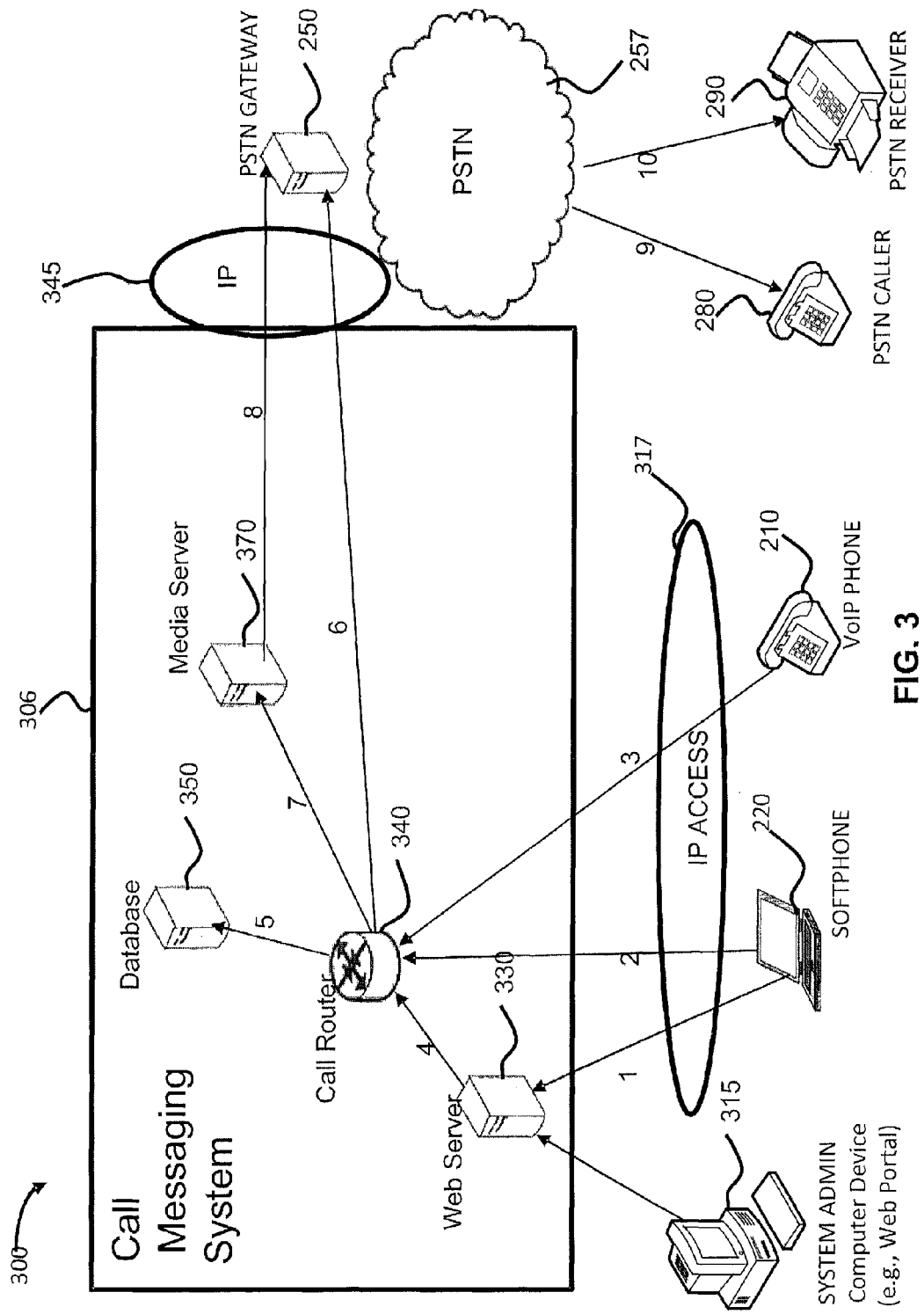
FIG. 3 is a diagram of a call management system that is configured to identify inbound calls, according to at least one embodiment of the invention.

FIG. 3 is a diagram 300 of a call management system that is configured to identify calls, according to at least one embodiment of the invention, Call management system 306 can include call router 340, which can be a circuit switch, a softswitch, or any other suitable switch that can be used to route calls in response to customized routing rules. Call router 340 can be configured to receive inbound calls from a first caller device 280. Call router 340 or another call router 340 (not shown) can be further configured to route the inbound call to a desired destination. For example, call router 340 can be configured to route an inbound call to media server 370 to play announcements to first caller device 280, or call router 340 can be configured to cause media server 370 to play announcements to another telephone, such as via a PSTN gateway 250 to one or more public switched telephone network devices 290. Call management system 306 can include a Database 350 or any other storage mechanism for maintaining caller identification rules, and subsequent actions to: create routing rules, define ringing groups, apply distinctive ringing and collect and match any answering party PIN to a database 350 storing authorized PINs. Networks 317 and 345 can be IP networks, Call management system 306 also can include one or more configuration tools including a Web Server 330 to configure the rules for filtering, announcing, routing and completing calls. A computing device 315—as a system administrator or an authorized user—can configure web server 330 to modify call action rules stored, for example, in repository 130 (FIG. 1) and/or database 350. As such computing device 315 and/or web server 330 can maintain a Database 350 (or any other storage mechanism) for storing system administrator rules and/or end user defined rules. Examples of some tools that support inbound call identification include client applications, such as contact management, appointment and calendar systems, any of which can be found in, for example, an email program.

Database 350 can store call history information for each inbound call. For example, database 350 can maintain data representing a first party calling-ID (e.g., based on using ANI), a type of endpoint associated with the first calling party, such as a PSTN phone 280, a second destination endpoint DNIS, a result code (e.g., indicating a recipient status) if the call was connected or not connected, and the result of each prior call (e.g., whether the previous call history includes no answers at callee device 108 of FIG. 1). Database 350 can also be configured to retain customer credit information, satisfaction information and other customer profile information associated with each inbound caller-ID. Database 350 also can store call transfer, conferencing, recording, and customer feedback information.

In one embodiment, Call Router 340 can access Database 350 for accessing default and dynamic routing rules. In particular, Database 350 can contain default routing rules and customized routing rules, such as those that detail the priority order by which to route calls, for example, the time of day, and other methods to ring each of the callee endpoints.

Figure 4A:
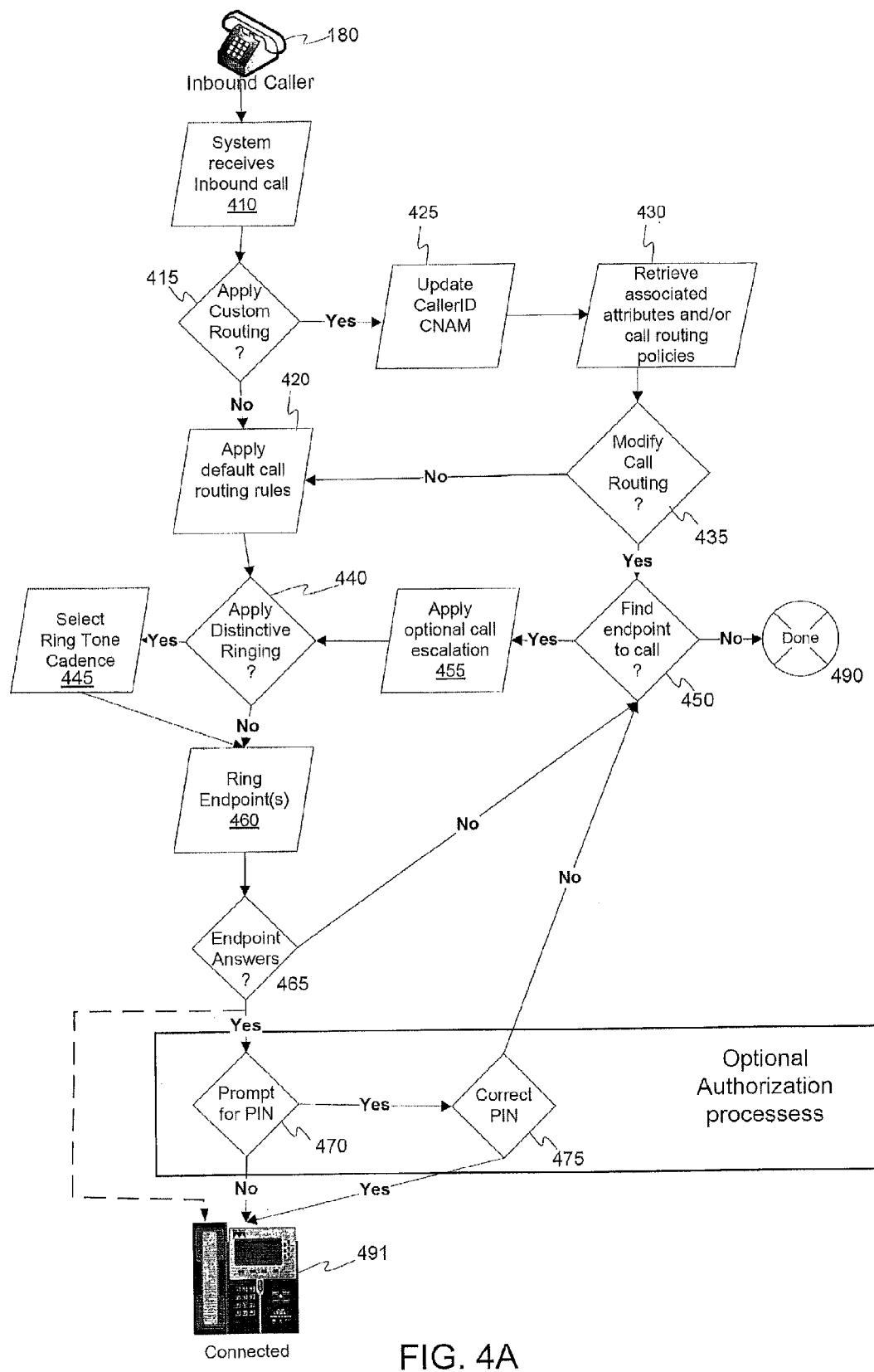
FIG. 4A is a flow diagram that depicts an example of a method of managing inbound calls, according to at least one embodiment of the invention.

FIG. 4A is a flow diagram 400 that depicts an example of a method of managing inbound calls, according to at least one embodiment of the invention. The call management system can be configured to implement Database 350 (FIG. 3) to maintain default inbound caller identification rules and user-defined dispatching rules. An end-user (e.g., callee) can define and store custom call identification rules in Database 350 (FIG. 3) to augment and/or override the default call identification rules. Typically, end-users can use the Web Server 330 interface to define custom call identification rules. End-users can also use a client application (e.g., as part of softphone 220 of FIG. 3) or the PSTN interface 290 (FIG. 3) to configure and select custom call identification rules (e.g., selecting which attributes should be considered in dynamically routing a call and specifying the relative priority for an attribute). For an inbound call from an endpoint 280 (FIG. 3), the call management system can be configured to access Database 350 to apply default inbound call identification rules to ring a designated endpoint, such as endpoint ("VoIP phone") 210 (FIG. 3) or endpoint ("VoIP phone") 491.

At 410, the call management system receives an inbound call. For an inbound call, the call management system identifies whether to apply custom call routing at 415 as a function of routing criteria, for example, one or more attributes associated with a call. For example, a call router 340 (FIG. 3) can apply custom call routing upon matching an attribute associated with a call (or caller), such as a caller-ID. If there is no match, flow 400 can move to 420 to apply default routing rules. For example, call router 340 can apply the default call routing rules. But if there is a match that specifies call routing as a function of one or more attributes, the call management system can update attributes regarding the call and/or the caller to reflect, for example, that a pending call has been made at particular time, that the call had been directed to a specific destination phone number or email address, and the like. This information can form part of the call history that is maintained to guide pending and subsequent call routing. For example, call router 340 can revise data at 425, the data being referenced by the caller-ID data and/or CNAM data (CNAM refers to "Calling NAMe" and is a communication network service that displays the caller's name on the calling party's digital readout.). Thus, call router 340 can be configured to record call activity/history, among other things, and then can optionally use the updated data (e.g., updated attribute information) associated with caller-ID to access the Database 350 (FIG. 3) to retrieve stored information and policies at 430. In various embodiments, data representing a caller-ID and data representing a CNAM can be presented to (or associated with) potential answering parties, and, as such, a caller can be "aliased" for escalation purposes. For example, the call management system can be configured to map an attribute (e.g., caller ID) to another attribute (e.g., destination contact ID) to dynamically retrieve multiple destination phone numbers from an application for purposes of call routing in accordance with one or more call routing policies. Examples of stored information and policies include caller history, user-defined call identification policies, timers, endpoint presence status, and the like.

In at least some embodiments, the stored information and policies can provide for dynamic modification of the call routing rules (i.e., applying customized routing rules) at 435, so as to find a new endpoint to call at 450. From associated Database 350 (FIG. 3) policies, call router 340 can escalate the call routing policy at 455, thereby changing the inbound call priority. In at least some embodiments, depending upon the call priority and call routing policy, dynamic routing can be applied at 455 to determine a modified call route for an incoming call, where the dynamic call routing can be determined as a function of one or more attributes (e.g., call priorities, time of day, location, etc.). Depending upon the call priority and call routing policy, call router 340 can change the default ringing cadence to a custom distinctive ringing cadence at 440 and assign to an endpoint a new ringing cadence, ringing tone, and/or sound at 445 from a collection of ring tone cadences or sounds representing prioritized calls.

At 460, the call management system rings one or more endpoints. At 465, the call management system can determine whether the endpoint answers. If it does, then the call management system can be configured optionally to prompt the answering endpoint at 470 to input a personal identification number (PIN), or input a name (e.g., verbally) or other identifying information. Data representing answering endpoint responses provided at 475 can be compared to validation data in Database 350. Thus, the call management system can validate whether entered data matches a valid PIN, as well as analyze verbal inputs (e.g., using speech recognition algorithms) to match against expected responses. Or, the caller responses can be presented to potential answering parties who can access the caller responses to determine whether to connect with the caller. Matching responses can connect the call to callee phone 491. Non-matching responses can be directed to the call router 340 where either additional endpoints can be called at 450, or the calling party can be disconnected at 490.

Figure 4B:
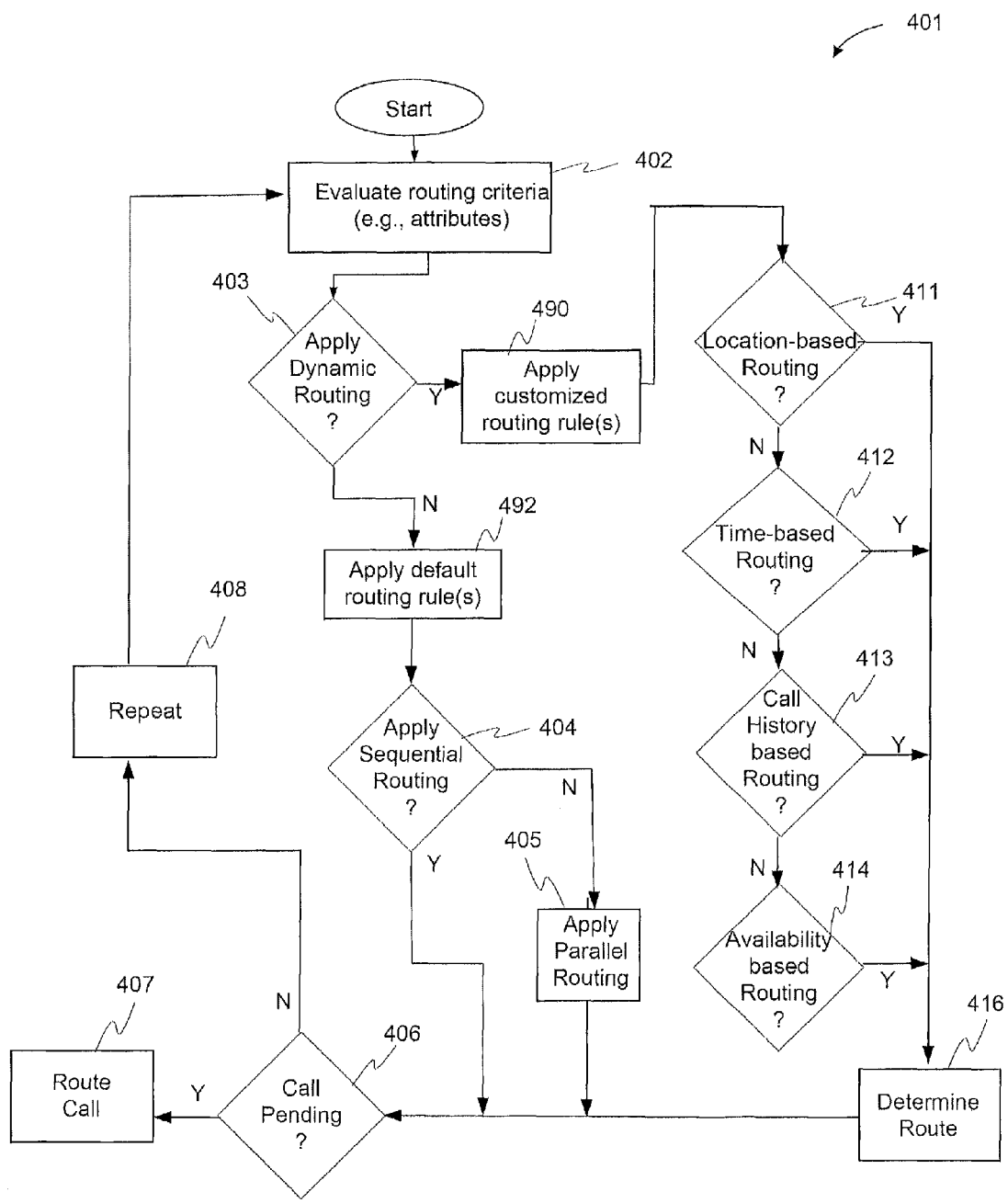
FIG. 4B is a flow diagram that depicts an example of a method of implementing dynamic routing, according to at least some embodiments of the invention.
Figure 6:
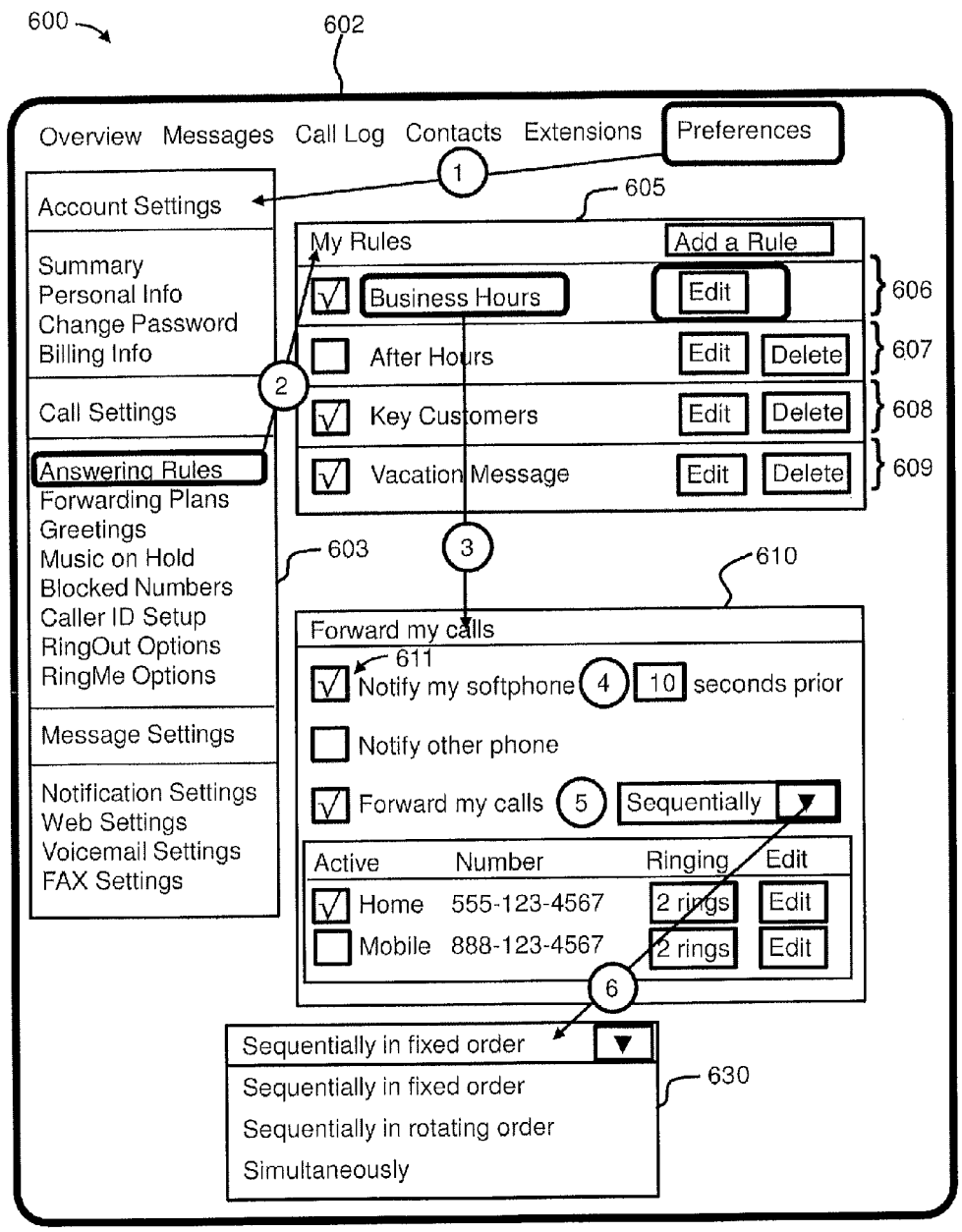
FIG. 6 is a diagram showing an example of an interface 602 configured to modify call routing rules used by a call management system, according to at least one embodiment of the invention.

FIG. 4B is a flow diagram 401 that depicts an example of a method of implementing dynamic routing, according to at least some embodiments of the invention. A call management system can be configured to implement a database to maintain default inbound caller identification and routing rules, as well as customized routing rules that can be dynamically implemented as a function of caller attributes, for example. At 402, a call management system (e.g., a CMS controller) can evaluate attributes against routing criteria that, when met, can dynamically modify call routing. If the call management system determines that dynamic routing is not to be applied at 403, then flow 401 applies default routing rules at 492 and continues to 404, at which a determination is made to use a default routing, such as whether to apply sequential routing. Otherwise flow 401 moves to 405 at which parallel routing can be applied. Examples of configuring routing as either sequential routing or parallel routing are shown in FIG. 6, wherein panel 630 of FIG. 6 can select a preference between the two. Note that these preferences can be overridden, at least in some cases, by dynamic routing. Sequential routing can refer to a sequence of phone number to be called when a present phone number yields no answer (e.g., if callee is not present, then person A is called, and if person A is unavailable, person B is called, etc.), whereas parallel routing can include concurrently ringing two or more callee devices to reach any callee.

But if a determination to use dynamic routing is made at 403, customized routing rules are applied at 490. Flow 401 then moves to 411 to determine whether location-based routing should be implemented. For example, routing rules can be dynamically modified based on the caller's location, one or more callee's location, the distances between callers and callees, and the like. If not, then flow 401 moves to 412 to determine whether time-based routing should be implemented at 412. For example, default routing rules can be dynamically modified based on the time of day (e.g., during business hours or after hours), holidays, weekend days, vacation days, and the like. If not, then flow 401 moves to 413 to determine whether history-based routing should be implemented. For example, default routing rules can be dynamically modified based on a caller's call history during a time interval (e.g., call routing can be dynamically modified if the caller calls a certain number of times in one day), a caller's history of calls to a particular phone number (e.g., representing a service), and the like. If not, then flow 401 moves to 414 to determine whether availability-based routing should be implemented. For example, default routing rules can be dynamically modified based on a callee's availability to receive a call (e.g., whether a callee is present, such as determined by SIP presence protocol, whether the callee has set "do not disturb" on the callee device, and other like conditions during which the callee may be unavailable). At 416, a determination is made that the route that will be implemented (e.g., as a result of passing through 411, 412, 413, and 414). Note that in some embodiments, a call management system can evaluate each of the types of routing conditions set forth in 411, 412, 413, and 414 and can select one or more routing bases by which to determine a route. For example, a call management system can dynamically route calls based on both location-based routing rule modifications and time-based routing rule modifications, whereby both can be applied in complementary fashion, or one can take precedence (or priority) over the other. At 406, a determination is made as to whether a call is pending. If so, then call will be routed at 407, otherwise flow 401 will be repeated at 408 to determine whether any routing criteria (i.e., attributes) specify whether to invoke default or dynamic routing.

Figure 5:
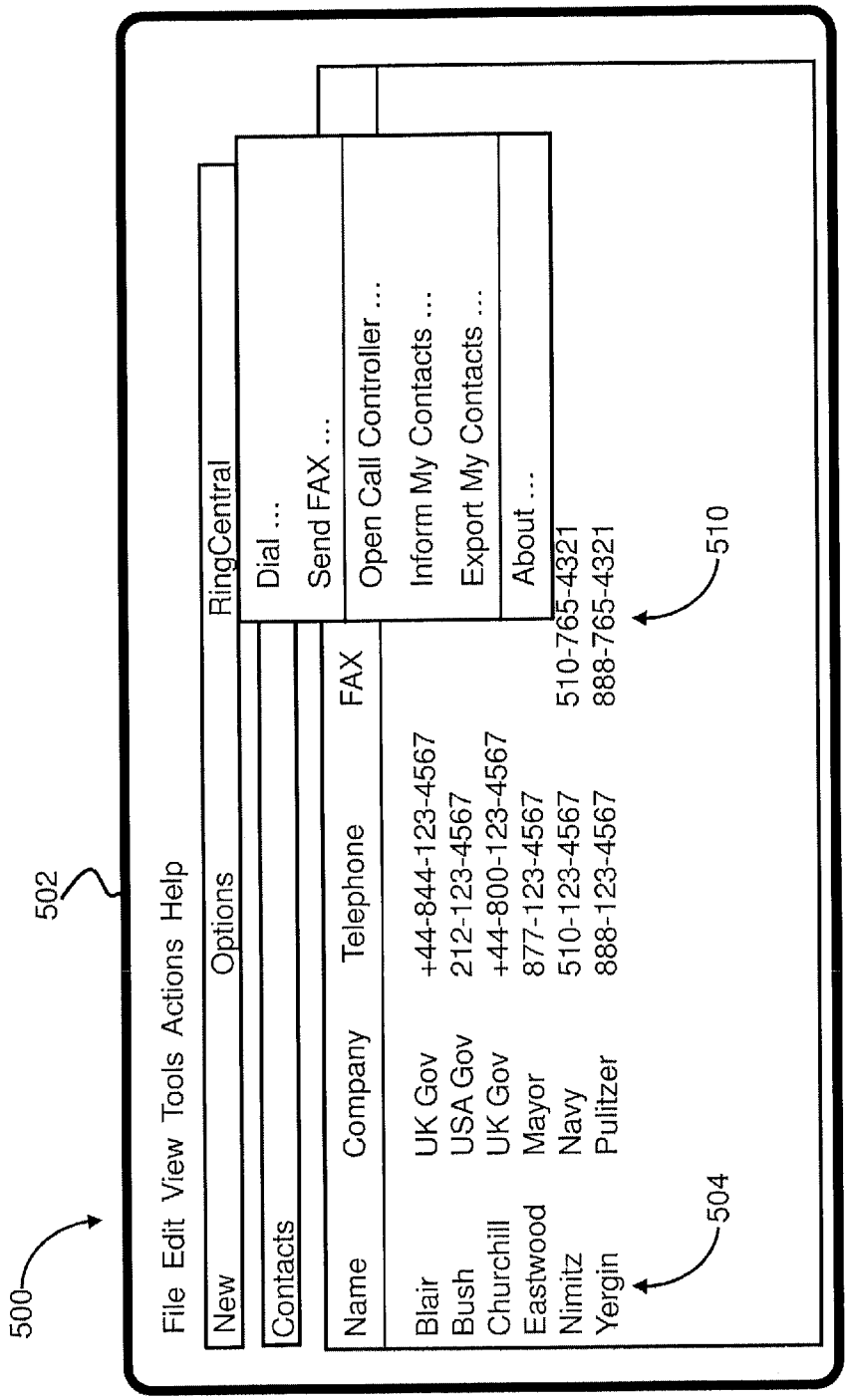
FIG. 5 is a diagram showing an example of an interface that can be implemented to associate contacts to caller IDs, according to at least one embodiment of the invention.

FIG. 5 is a diagram 500 showing an example of an interface that can be implemented to associate contacts to caller IDs, according to at least one embodiment of the invention. Here, interface 502 includes input fields for entering destination contact IDs 504 (e.g., a name) and associated phone numbers 510 and 512 that can be associated with a caller ID. In some examples, phone numbers 510 and 512 can respectively include primary business phone numbers and home phone numbers, by which the call management system can prioritize primary business phone number as higher during work hours (and can dial these numbers before home numbers) and can prioritize home phone numbers as higher after work hours (and can dial these numbers before primary business numbers). Here, a contact list can be exported into a web server 330 (FIG. 3). If a caller record is not contained in a web site view, in a user PC or any other computer application (such as Microsoft Outlook®), or in a client call controller softphone contact book, then an application at the callee device can manually or automatically add the caller or callee information for routing the call. By matching the caller-ID to a caller name, or to a web site, or to the user PC application (such as Microsoft Outlook), or to the client call controller application (e.g., "CC softphone"), a caller's contact information and any saved notes can be displayed. The callee can then add notes to a caller record.

FIG. 6 is a diagram 600 showing an example of an interface 602 configured to modify default call routing rules used by a call management system, according to at least one embodiment of the invention. At 1, clicking on a Preferences selection in the menu can provide a call setting menu 603. At 2, clicking on Answering Rules as a user input menu 603 opens the Answering Rules Summary panel (or window) 605. At 3, the selection of a rule (or clicking on a rule editor) opens the Answering Rules panel (or window) 610. User inputs at portions 606, 607, and 608 of panel 610 can be configured to modify routing using time-based routing rules, whereas user inputs at portion 609 of panel 610 provide for prioritizing calls based on prioritized callers, such as key customers. At 4, a call controller application (e.g., a softphone application) can be configured to be notified in field 611 and then wait a configurable amount of time before the forwarding rules are implemented by the call management system, or the call controller application. At 5, checking the box enables forwarding, and selecting a forwarding option from the drop down box at 6 can provide for parallel or sequential routing of calls to different callee devices by using user input 630. In some embodiments, user input 630 is used to set default routing rules of either parallel or sequential routing of calls.

Figure 7:
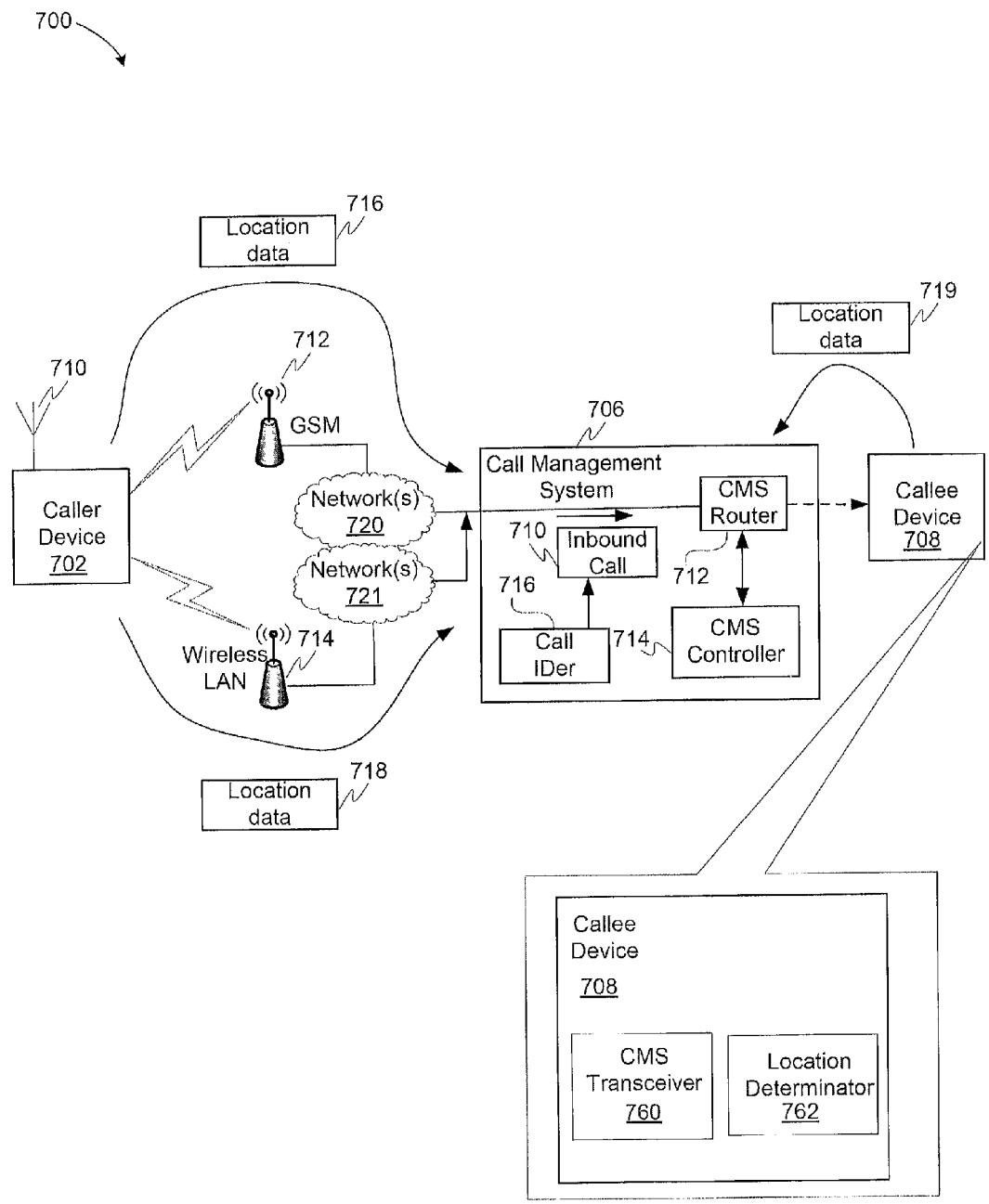
FIG. 7 is a diagram of a call management system that is configured to identify and route calls based on location, according to at least one embodiment of the invention.

FIG. 7 is a diagram 700 of a call management system that is configured to identify and route calls based on location, according to at least one embodiment of the invention. As shown here, call management system 706, callee device 708, inbound call 710, call management system router ("CMS router") 712, call identifier ("Call IDer") 716, and call management system ("CMS") controller 714, can have substantially similar function and/or structure to similarly named elements described herein. In at least some embodiments, caller device 702 can be configured to transmit and communicate with various cellular communication systems. As shown here, caller device 702 can establish communication links to transmit and receive data information via either an IP network, such as wireless LAN 714, or a digital cellular network, such global system for mobile communication ("GSM"), or both. In at least some embodiments, caller device 702 can be configured to generate data representing the location (e.g., a physical geographic location) of caller device 702. Caller device 702 can be configured with a receiver capable of determining the position of the device via, for example, the global positioning system ("GPS") or other navigation systems and the like. In some cases, caller device 702 can be configured to determine the position of the device through triangulation of nearby cellular communication towers, or other location determination methods.

In one embodiment, caller device 702 can be configured to generate location data, such as geographic coordinates, specifying the location or position of the device, and transmit the data via networks 720 and 721 to call management system 706. As shown here, caller device 702 can use antenna 710 to communicate with GPS satellites to generate data representing location or position information, such as Cartesian coordinates, other coordinate systems and the like. After generating location or position information, caller device 702 can then transmit location data 716 as coordinates to call management system 706 via network 720 by GSM 712 or transmit location data 718 as coordinates to call management system 706 via network 721 by wireless LAN 714. In some examples, location or position information may be translated and packaged according to various telecommunication protocols including TCP/IP, cellular protocols compatible for communication via the Code Division Multiple Access System ("CDMA"), GSM, or the like, and VoIP or others. In some embodiments, call management system 706 may be configured to extract and interpret coordinates associated with data 716, coordinates associated with data 718, and the like. Call management system 706 may be configured to reconstruct inbound call data, such as coordinates 716 and coordinates 718. For example, caller device 702 can be configured to decompose data representing GPS data into relatively small sizes (e.g., sizes from multiple bits to bytes) that can be interleaved into packets (e.g., TCP/IP or GSM packets) that are communicated to call management system 706, which, in turn, can reconstruct the GPS data. Call management system 706 then can use the call data to manage the dispatch or routing of the inbound call, In one embodiment, call management system 706 can use caller location or position data to determine how to manage and handle an inbound call. Call management system 706 may identify the location or position of the caller or inbound call and manage the inbound call by selecting any number of call action policies such as configurable alert rules 132, distinctive ringing rules 134, call routing rules 136 or callee ringing group rules 138, which can have similar structures and/or functionalities as described in FIG. 1. In some cases, call management system 706 may apply different notifications or alerts, alter ringing rules, divert call routing or designate a ringing group based upon the geographic location of the caller. Note that in some embodiments, callee device 708 (as well as caller device 702) can include a CMS transceiver 760 and a location determinator 762. CMS transceiver 760 can be configured, for example, passively or proactively to transmit messages (e.g., via SMS or other suitable messages including location data 719) indicating the location of caller device 708 to communication management system 706 so that the location of caller device 708 (e.g., as a mobile phone) can be considered in routing phone calls and other electronic messages, As an example, if a customer calls a taxi company to request transportation services, the call management system 706 can identify the caller's location and immediately and directly can contact the driver closest to or otherwise having easiest access route to the caller. If the driver closest to the caller does not respond, or is not available, call management system 706 may then forward and direct the call to the next closest or otherwise most accessible driver, and so on. As another example, call management system 706 may use caller's geographic location to route the call to a person who can speak a requested language or demonstrate a special skill. If a customer calls an international company from a particular location, the call management system 706 can identify the caller's location and route the call to a call center staffed with individuals who speak a similar language.

Figure 8:
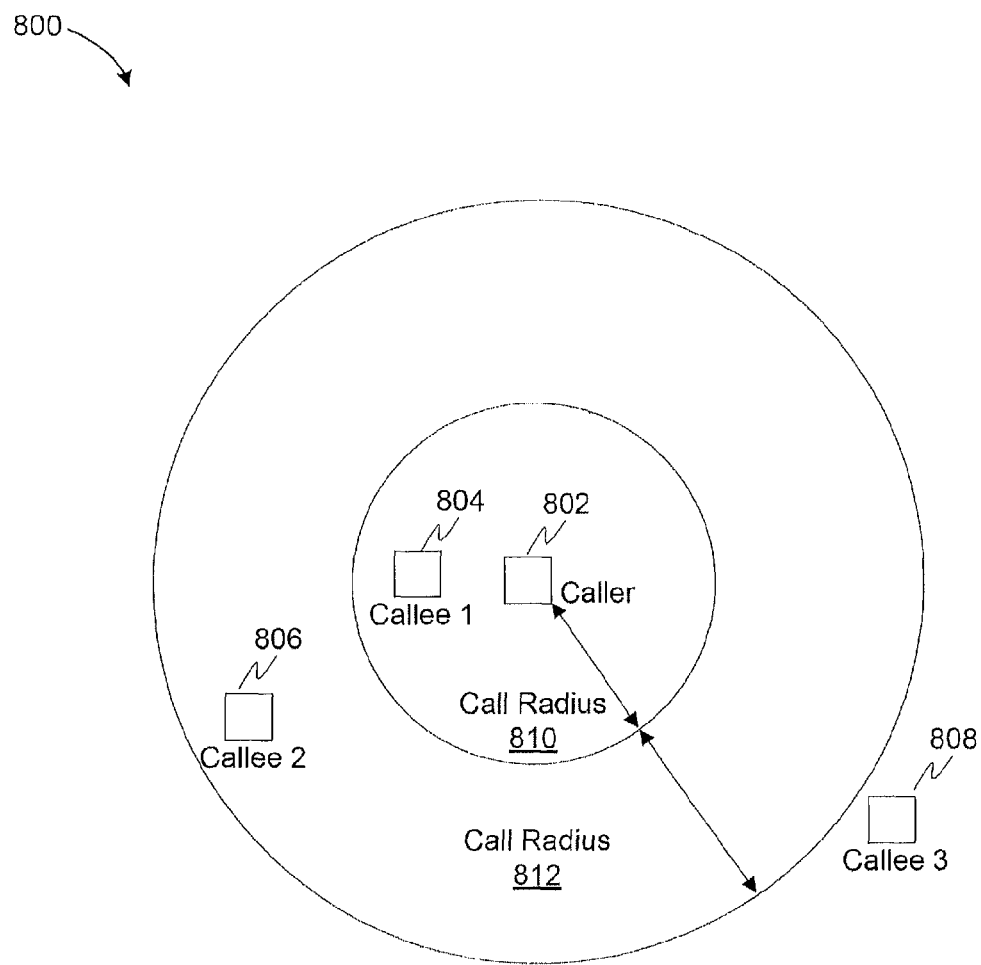
FIG. 8 is a diagram depicting the determination of locations of callees and a caller for routing calls, according to at least one embodiment of the invention.

FIG. 8 is a diagram 800 depicting an example of the determination of locations of callees and a caller for routing calls, according to at least one embodiment of the invention. A call management system can be used to identify the geographic location of caller 802. As shown here, call radius 810 represents an equidistant boundary of all points within 10 miles of caller 802 and call radius 812 represents an equidistant boundary of all points within 20 miles of caller 802. In one embodiment, inbound call from caller 802 may first be routed to an endpoint within call radius 810, such as callee ("1") 804. If callee ("1") 804 is not available, or refuses the call, inbound call from caller 802 may then be routed to an endpoint within call radius 812, such as callee ("2") 806. If callee ("2") 806 is not available, or refuses the call, inbound call from caller 802 may then be routed to callee ("3") 808, an endpoint beyond call radius 812. In another example, once all available endpoint options are exhausted, call management system 106, or 306, or 706, etc. may be configured to select a distinctive call ringer to notify the final available callee, such as callee ("3") 808, of the exhaustion of all available options for routing of the inbound call.

Figure 9A:
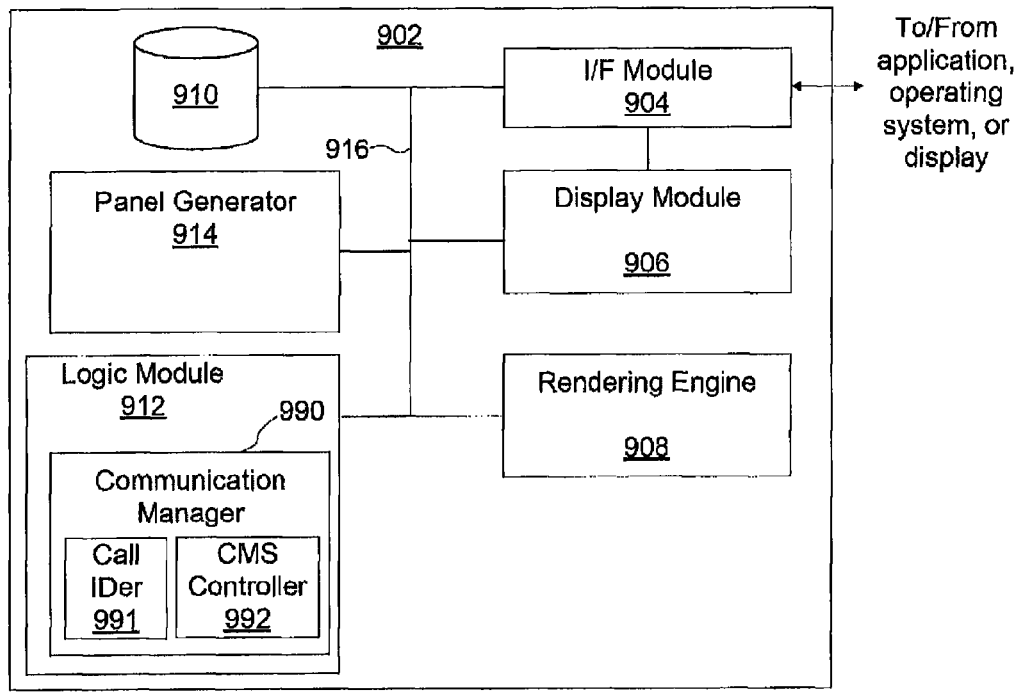
FIG. 9A illustrates an example of a panel presentation application for inbound call identification and management, according to various embodiments of the invention.

FIG. 9A illustrates an example of a panel presentation application for inbound call identification and management, according to various embodiments of the invention. As used herein, the term "panel," at least in one embodiment, can refer to displays, palettes, tabs, windows, screens, portions of an interface, and the like. In at least one embodiment, an interface to provide for inbound call identification and management can be implemented in a panel, such as a single panel, in one or more portions thereof, or in separate panels. Application 902 can be a softphone application (e.g., an application configured to adapt a computing device to perform known telephony functions), or an application disposed on a server, such as web server 330 (FIG. 3), to carry out the inbound call identification and management functionalities described herein. Here, application 902 includes interface ("I/F") module 904, display module 906, rendering engine 908, repository 910, logic module 912, panel generator 914, and data bus 916. In some examples, the number and type of elements shown and described may be varied and are not limited to the descriptions provided. In some examples, the above-described elements can be implemented as part, component, or module of application 902. As an example, application 902 can be implemented to include either commands for establishing rules to effect inbound call identification and routing and effecting communication among endpoints, the commands imparting functionalities as described herein. Logic module 912 can be implemented as software, hardware, circuitry, or a combination thereof to implement control logic for the described techniques for panel presentation.

Figure 9B:
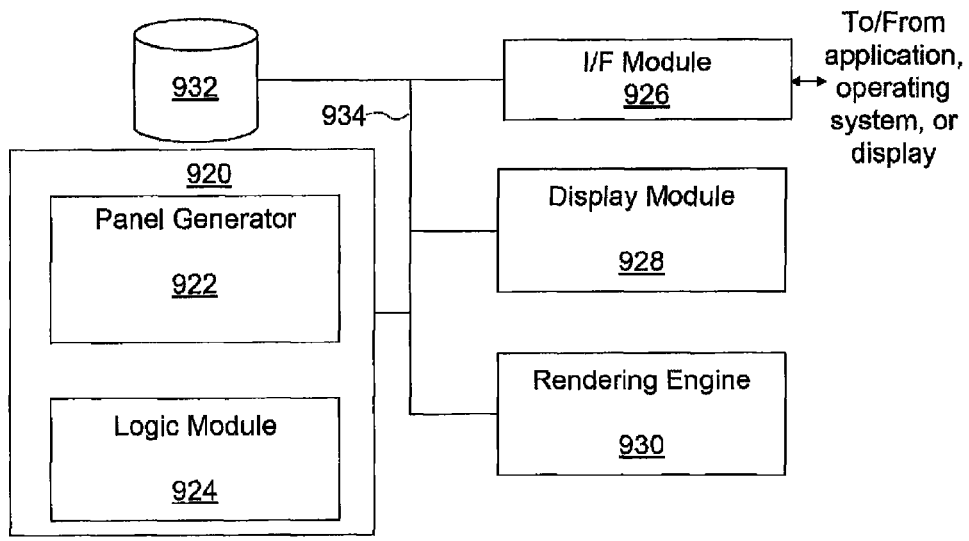
FIG. 9B illustrates an alternative example of a panel presentation application for implementing an interface to provide for inbound call identification and management, according to one embodiment of the invention.

In some examples, logic module 912 can be configured to control panel generator 914 to form a call management system configured to present call identification and management options to, for example, provide for customizable call routing. Rendering engine 908 can be configured to operate as a layout engine for web pages, for example, to manipulate both content (e.g., as expressed in or including HTML, XML, image files, etc.) and formatting information (e.g., as expressed in or including CSS, XSL, etc.) for rendering the data or information as one or more panels on interface 906 (FIG. 9). Interface module 904 can exchange panel presentation data, including content data, image data, audio data, as well as other data, between application 902 and another application (e.g., a host, client, web services-based, distributed (i.e., enterprise), application programming interface ("API"), operating system, program, procedure or others) that can use data and information generated from panel generator 914 to render presented panels on a display screen. In other examples, the above-described techniques and elements can be varied in design, implementation, and function and are not limited to the descriptions provided. In one embodiment, logic module 912 can include communication manager module 990 that is configured to include structure and/or functionality similar to one or more previously-described communication management systems and/or components thereof. For example, logic module 912 can also include a call identifier ("IDer") module 991 and a communication management system ("CMS") controller module 992, both of which can be configured to be accessed via an interface. For example, call identifier ("IDer") module 991 can be accessed to create and to modify attributes used to identify calls and callers that can be subject to call routing policies, and communication management system ("CMS") controller module 992 can be accessed to create and to modify rules and conditions used to route calls based on call routing policies that can be dynamically changed responsive to, for example, prioritized routing conditions, FIG. 9B illustrates an alternative example of a panel presentation application for implementing an interface to provide for inbound call identification and management, according to one embodiment of the invention. Here, application 920 includes panel generator 922 and logic module 924, which can have equivalent functionality as 912 of FIG. 9A. Further, application 920 is shown in data communication with interface ("I/F") module 926, display module 928, rendering engine 930, and repository 932. Data bus 934 can be configured to send or receive data among application 920, I/F module 926, display module 928, rendering engine 930, and repository 932. In other examples, more, fewer or different elements can be used and implemented without limitation to the examples provided above.

In some examples, logic module 924 and panel generator 922 can be implemented as part of application 920, which can be implemented separately from other functional components or modules, such as interface module 926, display module 928, rendering module 930, and repository 932. Data bus 934 can be implemented to communicate data over a given port between application 920 and interface module 926, display module 928, rendering module 930, and repository 932. In some instances, application 920 can be implemented as a standalone application or as a component (i.e., module) of another application. Data or information (e.g., content or file data including data describing one or more caller attributes, routing rules, route modification conditions, and the like) associated with a panel can be stored in repository 932, which can be implemented using a database, data store, data warehouse, or any other type of data repository or structure. In other examples, more, fewer, or different modules can be used to implement the described techniques for panel presentation and are not limited to those provided.

Figure 10A:
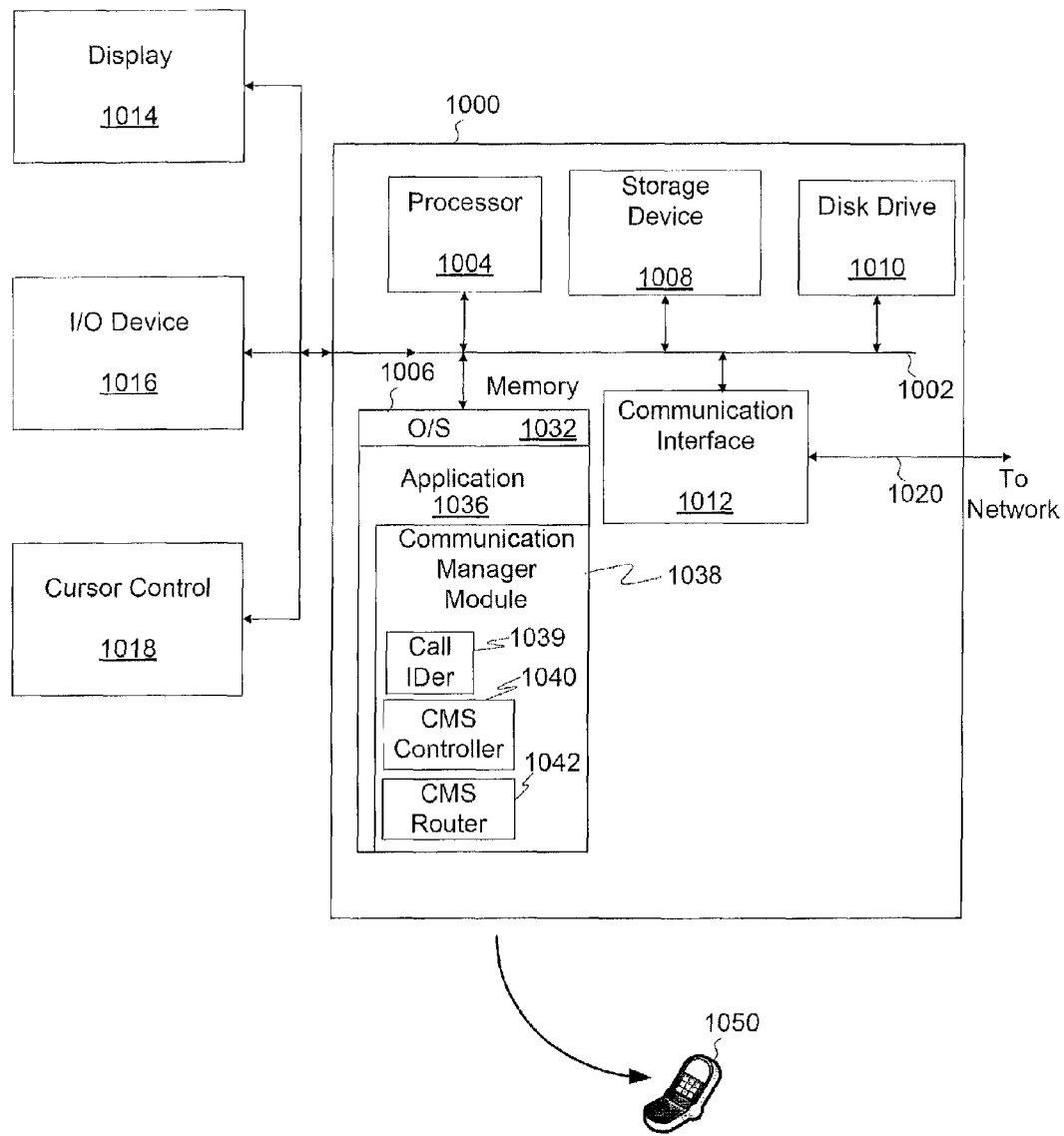
FIG. 10A illustrates an exemplary computer system suitable for identifying and routing calls, according to at least one embodiment of the invention.

FIG. 10A illustrates an exemplary computer system suitable for identifying and routing inbound calls, according to at least one embodiment of the invention. In some examples, computer system 1000 can be used to implement computer programs, applications, methods, processes, or other software to perform the above-described techniques and to realize the structures described herein. Computer system 1000 includes a bus 1002 or other communication mechanism for communicating information, which interconnects subsystems and devices, such as one or more processors 1004, system memory ("memory") 1006, storage device 1008 (e.g., ROM), disk drive 1010 (e.g., magnetic or optical), communication interface 1012 (e.g., a modem, Ethernet card, or any other interface configured to exchange data with a communications network), display 1014 (e.g., CRT or LCD), input device 1016 (e.g., keyboard), and pointer cursor control 1018 (e.g., mouse or trackball). In one embodiment, pointer cursor control 1018 invokes one or more specialized commands that can establish call routing policies as well as accepting inbound calls. Pointer cursor control 1018 can interact via a pointer cursor with interfaces for a call management system to identify and manage inbound calls.

According to some examples, computer system 1000 performs specific operations in which processor 1004 executes one or more sequences of one or more instructions stored in system memory 1006. Such instructions can be read into system memory 1006 from another computer readable medium, such as static storage device 1008 or disk drive 1010. In some examples, hard-wired circuitry can be used in place of or in combination with software instructions for implementation. In the example shown, system memory 1006 includes modules of executable instructions for implementing an operation system ("O/S") 1032, an application 1036, and a communication manager module 1038, which, in turn, can implement a call IDer module 1039, a CMS controller module 1040, and a CMS router 1042 to provide the functionalities described herein.

The term "computer readable medium" refers, at least in one embodiment, to any medium that participates in providing instructions to processor 1004 for execution. Such a medium can take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of electromagnetic, acoustic or light waves, such as those generated during radio wave and infrared data communications, Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 1000. According to some examples, two or more computer systems 1000 coupled by communication link 1020 (e.g., links to LAN, PSTN, or wireless network) can perform the sequence of instructions in coordination with one another. Computer system 1000 can transmit and receive messages, data, and instructions, including program code (i.e., application code) through communication link 1020 and communication interface 1012. Received program code can be executed by processor 1004 as it is received, and/or stored in disk drive 1010, or other non-volatile storage for later execution. In one embodiment, system 1000 (or a portion thereof) can be implemented as a hand-held device, such as a mobile phone 1050. But in other embodiments, system 1000 can be implemented as a personal computer (i.e., a desk top computer) or any other computing device.

Figure 10B:
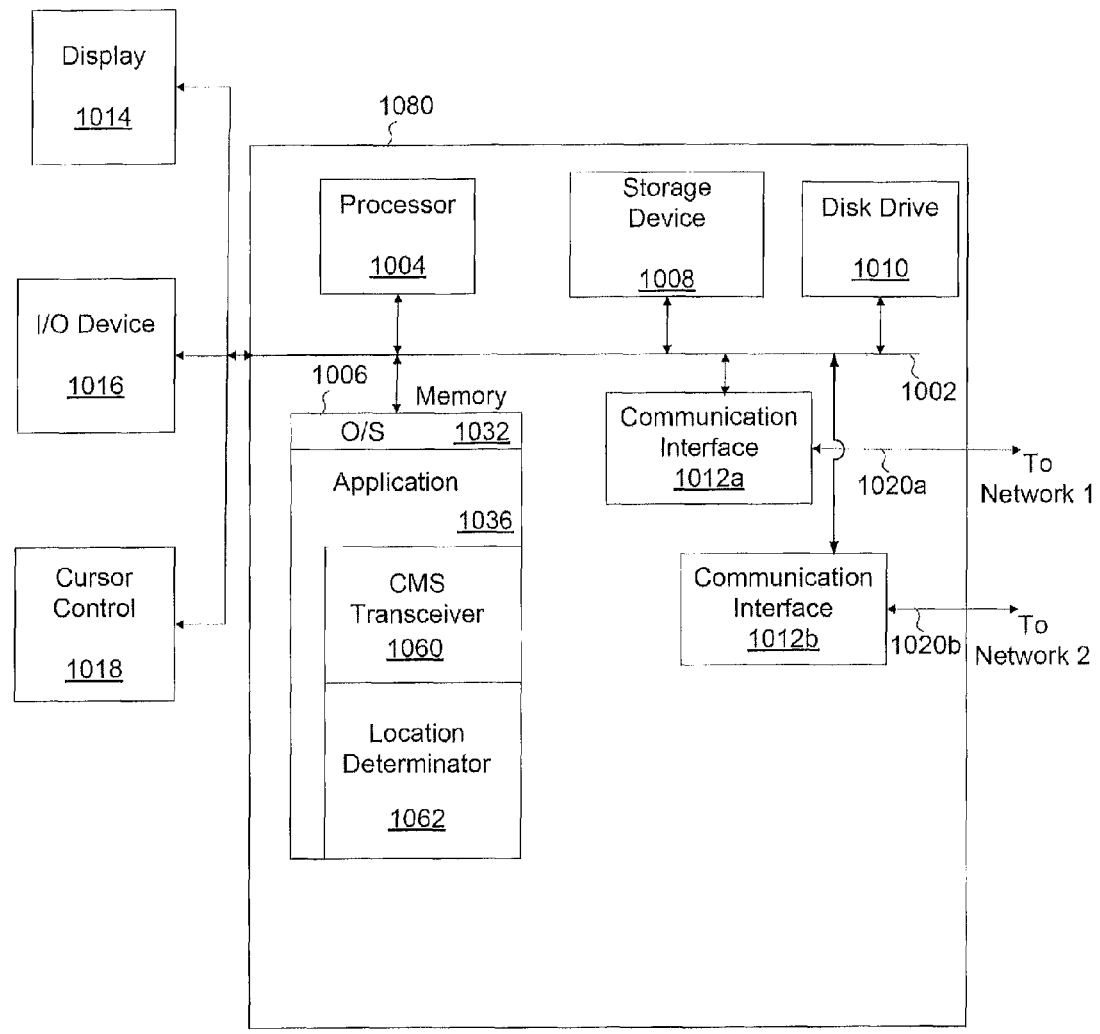
FIG. 10B illustrates another exemplary computer system suitable for facilitating call routing, according to at least one embodiment of the invention.
Figure 10B:
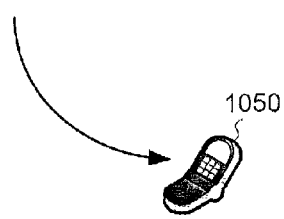

FIG. 10B illustrates another exemplary computer system suitable for facilitating call routing, according to at least one embodiment of the invention. In some examples, computer system 1080 can be used to implement computer programs, applications, methods, processes, or other software to perform the above-described techniques and to realize the structures described herein. According to at least some embodiments, computer system 1080 can include similar or equivalent functionalities and/or structures as computer system 1000 of FIG. 10A. As shown in FIG. 10B, computer system 1080 includes multiple communication interfaces 1012*a* and 1012*b*, and others not shown (e.g., a radio receiver to receive global positioning signals ("GPS")). In at least some embodiments, communication interface 1012*a* can provide a communication link 1020*a* to a network ("1") one, such as digital cellular network, and communication interface 1012*b* can provide a communication link 1020*b* to a network ("2") two, such as an IP network.

In the example shown, system memory 1006 can include modules of executable instructions for implementing a communication management system ("CMS") transceiver module 1060 that is configured to communicate with communication management systems described herein. Further, system memory 1006 can include a location determinator module 1062 that is configured to determine a position or location using signals obtained, for example, from cellular towers, from satellites, or from any source of location-determining signals. In one embodiment, system 1080 (or a portion thereof) can be implemented as a hand-held device, such as a mobile phone 1050. But in other embodiments, system 1080 can be implemented as a personal computer (i.e., a desk top computer) or any other computing device. To illustrate operation, consider that system 1080 can be implemented in a mobile phone 1080 as a caller device as described herein. Thus, system 1080 can use location determinator module 1062 to determine a location and use digital transmission cellular circuitry (e.g., communication interface 1012*b*), or CMS transceiver module 1060, to transmit the location (e.g., geographic location) of system 1050 along with or separate from (e.g., in parallel or in series) call data sent over any of the multiple networks, including IP and digital cellular networks. As another illustration, consider that system 1080 can be implemented in a mobile phone 1050 as a callee device as described herein. In this configuration, CMS transceiver module 1060 can be configured to, for example, passively or proactively transmit messages (e.g., via SMS or other suitable messages) indicating the location of mobile phone 1050 to a communication management system so that the location of mobile phone 1050 can be considered in routing phone calls and other electronic messages.

Figure 11:
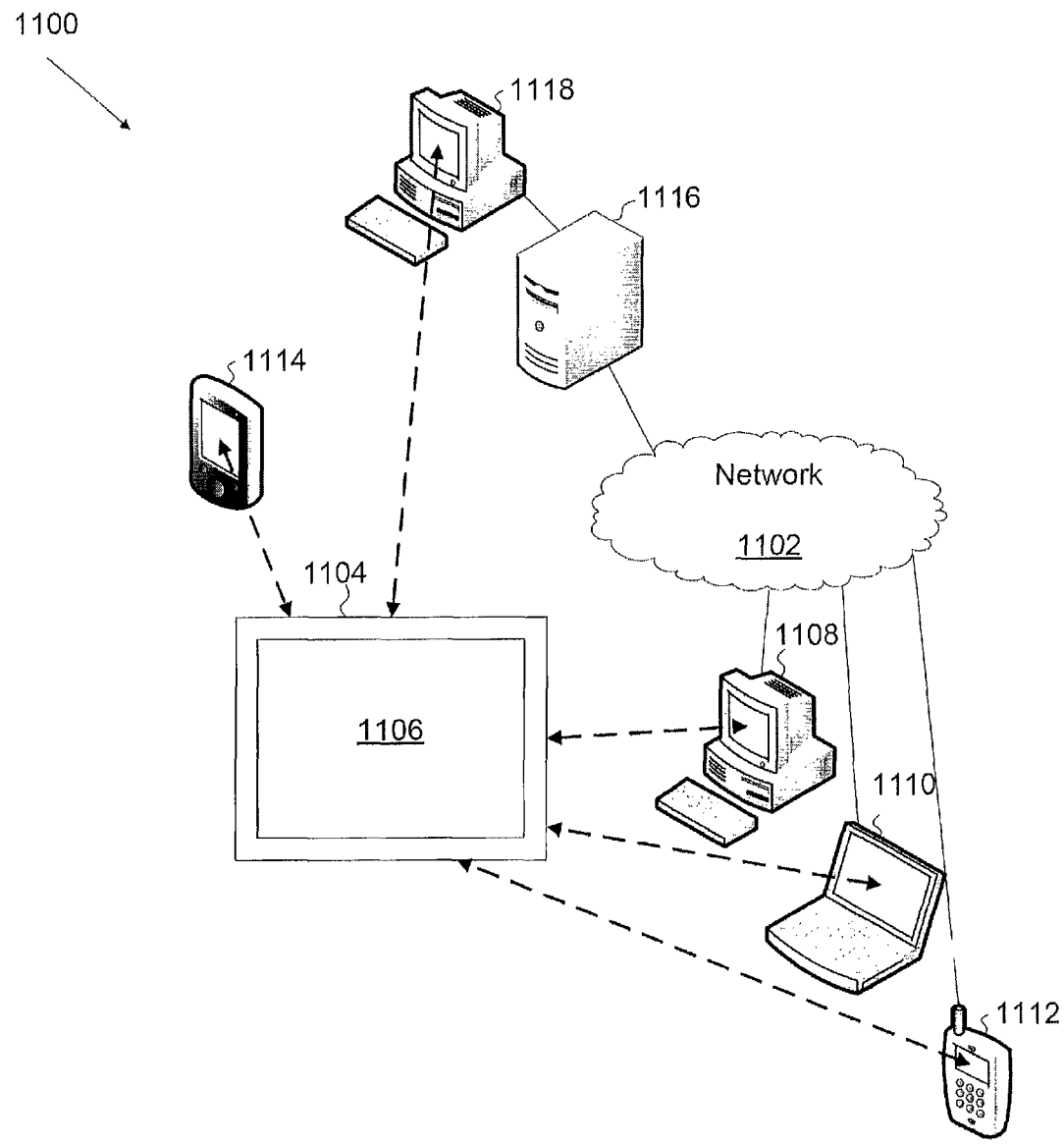
FIG. 11 illustrates an example of an interface for facilitating inbound call identification and management as well as communicating with endpoints via the interface, according to various embodiment of the invention.

FIG. 11 illustrates an example of an interface for facilitating inbound call identification and management as well as communicating with endpoints via the interface, according to various embodiment of the invention. Here, system 1100 includes network 1102, display environment 1104, interface 1106, which can be presented on devices such as computer 1108, notebook computer ("notebook" or "laptop") 1110, smart phone 1112, personal digital assistant ("PDA") 1114, server 1116, and administrator computer 1118. In other examples, the number and type of devices can be varied and are not limited to those shown and described.

In some examples, one or more panels for inbound call management and/or call communication (e.g., using interface 1106 for connecting calls, sending electronic messages, etc.) can be presented on interface 1106, which can be an interface for an application, such as a video and audio editing application, or as a web browsing program, Internet content portal, client or desktop application for any purpose. Panels can be used to provide additional or supplemental information that can be contextually relevant to another panel presented in interface 1106. Computer 1108, notebook computer ("notebook" or "laptop") 1110, smart phone 1112, personal digital assistant ("PDA") 1114, server 1116, and administrator computer 1118 can provide content data for rendering content as well as other data, which can be implemented to generate, for example, user inputs configured to accept data to modify call routing and to answer and make phone calls. In some cases, an operating system installed on computer 1108 can communicate (i.e., via an application programming interface ("API")) content data and/or other related data to another application installed on computer 1108 to render (i.e., interpreting data and information to draw or display the content in an interface) one or more panels presented in interface 1106. In some examples, different types of panels can be rendered in interface 1106. In one embodiment, interface 1106 can include any number and/or any type of display environments, such as CRT and LCD displays. Note that the above-described system and elements can be varied and are not limited to the descriptions or examples provided.

In at least some of the embodiments of the invention, the structures and/or functions of any of the above-described interfaces and panels can be implemented in software, hardware, firmware, circuitry, or a combination thereof. Note that the structures and constituent elements shown in FIGS. 9A to 11, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, FIex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A call management system comprising:
    a call identifier configured to identify a first attribute from a call received from a caller device and intended for a plurality of callee devices;
    a call management system controller configured to match the first attribute against routing criteria specified in a first customized routing rule, and to substitute the customized routing rule to bypass the use of a default routing rule based on the match between the first attribute and the routing criteria; and
    a call management system router configured to route the call from the caller device to a target callee device in the plurality of callee devices based on location data representing a first location associated with the caller device and a second location associated with the target callee device.

2. The call management system of claim 1, wherein the first attribute is data representing a phone number associated with the target callee device.

3. The call management system of claim 1, wherein the call management system further comprises:
    a processor configured to execute instructions to extract data representing destination contact identifiers from applications executing on callee devices of the plurality of callee devices, wherein the routing criteria specified in the first routing rule include criteria for routing calls as a function of matches between phone numbers identified in attributes of received calls with the extracted destination contact identifiers.

4. The call management system of claim 1, wherein the call management system controller is further configured to receive:
    location data describing a geographic location of the caller device; and
    location data describing geographic locations of the plurality of callee devices, wherein the routing criteria specified in the first customized routing rule include criteria for routing calls as a function of differences between the geographic location of the caller device and the geographic locations of the plurality of callee devices.

5. The call management system of claim 4, wherein the call identifier is further configured to:
    identify a second attribute of the target callee device, the second attribute specifying location data describing a geographic location for the target callee device.

6. The call management system of claim 5, wherein the routing criteria specified in the first customized routing rule specify that the call management system router is to route the call to a nearest available callee device of the plurality of callee devices relative to the caller device,
    wherein the target callee device is the nearest available callee device relative to the caller device.

7. The call management system of claim 5, wherein the routing criteria specified in the first customized routing rule specify that that the call management system router is to route the call to a farthest available callee device relative to the caller device in the plurality of callee devices,
    wherein the target callee device is the farthest available callee device relative to the caller device.

8. A method comprising:
    identifying a first attribute from a call received from a caller device and intended for a plurality of callee devices;
    matching the first attribute against routing criteria specified in a first customized routing rule;
    substituting the customized routing rule to bypass the use of a default routing rule based on the match between the first attribute and the routing criteria; and
    routing the call from the caller device to a target callee device in the plurality of callee devices based on location data representing a first location associated with the caller device and a second location associated with the target callee device.

9. The method of claim 8, wherein the first attribute is data representing a phone number associated with the target callee device.

10. The method of claim 8, further comprising:
    extracting data representing destination contact identifiers from applications executing on callee devices of the plurality of callee devices, wherein the routing criteria specified in the first routing rule include criteria for routing calls as a function of matches between phone numbers identified in attributes of received calls with the extracted destination contact identifiers.

11. The method of claim 8, further comprising:
    receiving location data describing a geographic location of the caller device and location data describing geographic locations of the plurality of callee devices, wherein the routing criteria specified in the first customized routing rule include criteria for routing calls as a function of differences between the geographic location of the caller device and the geographic locations of the plurality of callee devices.

12. The method of claim 11, further comprising:
identifying a second attribute of the target callee device, the second attribute specifying location data describing a geographic location for the target callee device.

13. The method of claim 12, wherein the routing criteria specified in the first customized routing rule specify routing the call to a nearest available device of the plurality of callee devices relative to the caller device, wherein the target callee device is the nearest available callee device relative to the caller device.

14. The method of claim 12, wherein the routing criteria specified in the first customized routing rule specify routing the call to a farthest available callee device relative to the caller device in the plurality of callee devices, wherein the target callee device is the farthest available callee device relative to the caller device.

15. A non-transitory computer storage medium encoded with instructions that, when executed by one or more computers, cause the one or more computers to perform operations comprising:
identifying a first attribute from a call received from a caller device and intended for a plurality of callee devices;
matching the first attribute against routing criteria specified in a first customized routing rule;
substituting the customized routing rule to bypass the use of a default routing rule based on the match between the first attribute and the routing criteria; and
routing the call from the caller device to a target callee device in the plurality of callee devices based on location data representing a first location associated with the caller device and a second location associated with the target callee device.

16. The computer storage medium of claim 15, the operations further comprising:
extracting data representing destination contact identifiers from applications executing on callee devices of the plurality of callee devices, wherein the routing criteria specified in the first routing rule include criteria for routing calls as a function of matches between phone numbers identified in attributes of received calls with the extracted destination contact identifiers.

17. The computer storage medium of claim 15, the operations further comprising:
receiving location data describing a geographic location of the caller device and location data describing geographic locations of the plurality of callee devices, wherein the routing criteria specified in the first customized routing rule include criteria for routing calls as a function of differences between the geographic location of the caller device and the geographic locations of the plurality of callee devices.

18. The computer storage medium of claim 17, the operations further comprising:
identifying a second attribute of the target callee device, the second attribute specifying location data describing a geographic location for the target callee device.

19. The computer storage medium of claim 18, wherein the routing criteria specified in the first customized routing rule specify routing the call to a nearest available callee device of the plurality of callee devices relative to the caller device, wherein the target callee device is the nearest available callee device relative to the caller device.

20. The computer storage medium of claim 18, wherein the routing criteria specified in the first customized routing rule specify routing the call to a farthest available callee device relative to the caller device in the plurality of callee devices, wherein the target callee device is the farthest available callee device relative to the caller device.

* * * * *